(12) United States Patent
Chu et al.

(10) Patent No.: US 7,818,286 B2
(45) Date of Patent: Oct. 19, 2010

(54) COMPUTER-IMPLEMENTED DIMENSION ENGINE

(75) Inventors: Chengwen Robert Chu, Cary, NC (US); Susan Christine Tideman, Durham, NC (US); Tonya Kelsey Chapman, Raleigh, NC (US)

(73) Assignee: SAS Institute Inc., Cary, NC (US)

( * ) Notice: Subject to any disclaimer, the term of this patent is extended or adjusted under 35 U.S.C. 154(b) by 3183 days.

(21) Appl. No.: 09/766,789

(22) Filed: Jan. 22, 2001

(65) Prior Publication Data

US 2002/0099581 A1    Jul. 25, 2002

(51) Int. Cl.
*G06F 17/30* (2006.01)

(52) U.S. Cl. .................................................... 707/600
(58) Field of Classification Search ................. 707/1–4, 707/6, 10, 100–102, 600; 345/418, 419, 345/440; 708/200, 270, 277; 715/502, 503, 715/509, 514, 700, 716, 764, 848, 853
See application file for complete search history.

(56) References Cited

U.S. PATENT DOCUMENTS

| 5,930,798 | A  | * | 7/1999  | Lawler et al.    | 707/102 |
| 6,167,396 | A  | * | 12/2000 | Lokken           | 707/737 |
| 6,212,526 | B1 | * | 4/2001  | Chaudhuri et al. | 707/102 |
| 6,480,194 | B1 | * | 11/2002 | Sang'udi et al.  | 345/440 |
| 6,490,719 | B1 | * | 12/2002 | Thomas           | 717/107 |
| 6,505,185 | B1 | * | 1/2003  | Chickering       | 706/55  |
| 6,750,864 | B1 | * | 6/2004  | Anwar            | 345/440 |

OTHER PUBLICATIONS

David M. Brown, "Indexing HTML Files", Mar. 12, 1999,http://64. 233.179.104/search?q=cache:eRC9roYtLWMJ:indexpup.com/in-dex-list/1999/March_08_1999.txt+mini-index+copyright+2000+ decision+tree&hl=en.*
Morgan C. Wang,"What is a Decision tree", Oct. 2002,http://64.233. 161.104/search?q=cache:aPZGmufBOplJ:dms.stat.ucf.edu/ sta6714notes/STA6714_Lecture4%255CNotes%255Cdecision %2520treespt+logworth&hl=en.*

* cited by examiner

*Primary Examiner*—Debbie Le
(74) *Attorney, Agent, or Firm*—Jones Day

(57) ABSTRACT

A computer-implemented dimension engine that automatically identifies the market segments represented in user-specified input data. The dimension engine creates new dimension variables based on those segments that most accurately predict the outcomes of a target variable. A data store is used to store the input data. A decision tree processing module determines a subset of the dimension variables to split the input data. The splitting of the dimension variables predicts the target variable. A multi-dimension viewer generates a report using the determined dimension variables subset and the splitting of the dimension variables.

61 Claims, 21 Drawing Sheets

Detailed Results

Selected Dimensions | Recommended Dimensions | Both

| STATECOD | AE | | AK | | AL | | AP | | AR | | AZ | | CA | | CO | | CT | | DC | | DE | | FL | | GA | |
| --- | --- | --- | --- | --- | --- | --- | --- | --- | --- | --- | --- | --- | --- | --- | --- | --- | --- | --- | --- | --- | --- | --- | --- | --- | --- | --- |
| GENDER | N | SUM | N | SUM | N | SUM | N | SUM | N | SUM | N | SUM | N | SUM | N | SUM | N | SUM | N | SUM | N | SUM | N | SUM | N | SUM |
| female | 8 | 6 | 1 | 0 | 28 | 13 | 2 | 1 | 16 | 8 | 19 | 8 | 123 | 66 | 20 | 10 | 18 | 10 | 5 | 5 | 10 | 5 | 75 | 37 | 44 | 29 |
| male | . | . | 1 | 0 | 13 | 6 | 1 | 0 | 6 | 3 | 7 | 5 | 30 | 13 | 4 | 2 | 4 | 2 | . | . | 2 | 1 | 16 | 8 | 8 | 3 |

Fig. 8

Detailed Results

| Selected Dimensions | Recommended Dimensions | Both |
|---|---|---|

_DOMESTIC_RECDIM
_APPAREL_RECDIM
_RECENCY_RECDIM
_AMOUNT_RECDIM
_FREQUENT_RECDIM

| | DOMESTIC<3.5 | | | | | | | |
|---|---|---|---|---|---|---|---|---|
| | APPAREL<1.5 | | | | APPAREL>=1.5 | | | |
| | RECENCY<174 | | RECENCY>=174 | | RECENCY<174 | | RECENCY>=538.5 | |
| | AMOUNT<538.5 | AMOUNT>=538.5 | AMOUNT<538.5 | AMOUNT>=538.5 | AMOUNT<538.5 | AMOUNT>=538.5 | AMOUNT<538.5 | AMOUNT>=538.5 |
| | N SUM | N SUM | N SUM | N SUM | N SUM | N SUM | N SUM | N SUM |
| FREQUENT<2.385 | 304 139 | 39 118 | 89 18 | 605 18 | 228 16 | 54 39 | 69 10 | 18 12 |
| FREQUENT>=2.385 | 204 | 49 | 116 | 9 | 6 | 50 | 112 | 70 |

*Fig. 9*

Detailed Results — 160

| Selected Dimensions | | Recommended Dimensions | | | | Both | | | |
|---|---|---|---|---|---|---|---|---|---|
| | | AE | | | | AK | | | |
| | | FREQUENT<2.385 | | FREQUENT>=2.385 | | FREQUENT<2.385 | | | |
| | | DOMESTIC<3.5 | | DOMESTIC<3.5 | DOMESTIC>=3.5 | DOMESTIC<3.5 | | | |
| STATECOD — 132 | | APPAREL<1.5 | APPAREL>=1.5 | APPAREL<1.5 | APPAREL>=1.5 | APPAREL<1.5 | | | |
| _FREQUENT_RECDIM — 142 | | RECENCY<174 | RECENCY<174 | RECENCY>=174 | RECENCY<174 | RECENCY>=174 | | | |
| _DOMESTIC_RECDIM — 144 | | AMOUNT<538.5 | AMOUNT<538.5 | AMOUNT>=538.5 | AMOUNT<=538.5 | AMOUNT<=538.5 | | | |
| _APPAREL_RECDIM — 146 | | | | | | | | | |
| _RECENCY_RECDIM — 148 | | | | | | | | | |
| _AMOUNT_RECDIM — 150 | | | | | | | | | |
| GENDER — 134 | N | SUM | N | SUM | N | SUM | N | SUM | N | SUM |
| Female | 3 | 2 | 1 | 1 | 1 | 0 | 2 (136) | 1 | 1 | 0 |
| male | . | . | . | . | . | . | . | . | . | . |

*Fig. 10*

COMPUTER-IMPLEMENTED DIMENSION ENGINE

BACKGROUND

1. Technical Field

The present invention is directed to the field of data mining. More specifically, the present invention is directed to a multi-dimension analysis computer system for understanding outcomes of business activities.

2. Description of Related Art

Enterprises generate large volumes of transactional data that are generally stored in a data warehouse or an On-Line Analytical Processing (OPAL) system. This transactional data contains information on the outcomes of enterprise operations. For example, a for-profit business will have records of which customers bought what products. Similarly, a government agency may have records on which people requested what services. Likewise, a non-profit organization may have records of which donors gave money to what projects.

The enterprise data warehouse also contains the characteristics of the business that are related to the transactions. For example, a for-profit business may track the sales by region, and may have additional information about each sales region, such as the number of sales people and the number of years of experience for each sales person. Similarly, a government agency may track the methods of requesting services and the methods of responding to those requests. Similarly, the non-profit organization may track the activities of each of its projects by region and the amount of publicity for each project.

Additionally, the enterprise's data warehouse may have data on the characteristics of the customers, people, and donors, (that is, the transactors) who made the transactions. One characteristic that is often known is the location of the transactor. Other characteristics depend on the enterprise. For example, a business-to-business for-profit company may know what industry its customer is in. Similarly, a government agency may know the person's social security number. And a non-profit organization may know whether the donor is a volunteer at the organization.

Thus, an enterprise may have three or more types of data: (a) data on outcomes, (b) data on business characteristics and (c) data on transactor characteristics. This data can be merged and analyzed to provide information that the enterprise can use to respond to the transactors or potential transactors in order to increase the probability of a good outcome.

One way to analyze the transactional data is to understand what market segments are represented in the data. This understanding may lead to many different operating decisions for the enterprise. For example: (1) targeted advertising campaigns for each different market segment or group of related market segments may be prepared, (2) targeted products, services, and programs can be prepared for different market segments, and (3) employees can be assigned to train in, answer questions from, and consult with the different market segments. One would appreciate that there is an unlimited number of other business decisions that might be made through the understanding of these market segments. Generally speaking, by understanding the market, the enterprise can better understand the interests of the transactors and better prepare to improve the outcomes of the transactions.

In the past, given smaller amounts of data, enterprises could develop an intuition about the market segments by reviewing each transactor's account or by scanning the data manually. Business analysts used statistical software tools to separate the transactions into groups or clusters, whose data could be reviewed to form an intuition about the market segments. Now, with large volumes of data, particularly from transactions on the Internet, knowing the transactors personally and scanning "by eye" are impractical. Similarly, the number of statistical runs that would be required becomes impractical. And thinking in terms of the previous approaches' way of categorizing the market seems less and less useful.

Thus, previous approaches do not include an effective automated system to define market segments in a way that is most meaningful for understanding the outcomes of business activities given the large volume of data collected and maintained by an enterprise. Stated another way, previous approaches do not have an effective automated system that defines a relatively small (manageable) number of market segments.

SUMMARY

The present invention solves the aforementioned disadvantages as well as other disadvantages of the previous approaches. In accordance with the teachings of the present invention, a computer-implemented dimension engine ("D-Engine") is provided that automatically identifies the market segments represented in user-specified input data. The dimension engine creates new dimension variables. These dimension variables are the variables that most accurately predict the values of a variable that represents the outcome of a business activity. The outcome variable is called a target variable. A data store is used to store the input data. A decision tree processing module determines how to subset (also known as split) the values of the input variables, selects the split variables that best predict the target variable, and recommends these as dimension variables. A multi-dimension viewer generates reports using the recommended and/or user selected dimension variables and statistics based on the target variable.

BRIEF DESCRIPTION OF THE DRAWINGS

FIG. 8 is a graphical user interface that depicts exemplary results using class variables from the input data set;

FIGS. 9 and 10 are graphical user interfaces that depict exemplary results of the present invention, as displayed after the run;

FIG. 18 is a preferred data structure for a main index that is part of the model repository shown in FIG. 16;

FIG. 19 is a preferred data structure for a tree-type index that is part of the model repository shown in FIG. 16;

FIG. 20 is an alternative data structure for the tree-type index that is part of the model repository shown in FIG. 16;

DETAILED DESCRIPTION OF THE PREFERRED EMBODIMENT

Figure 1:
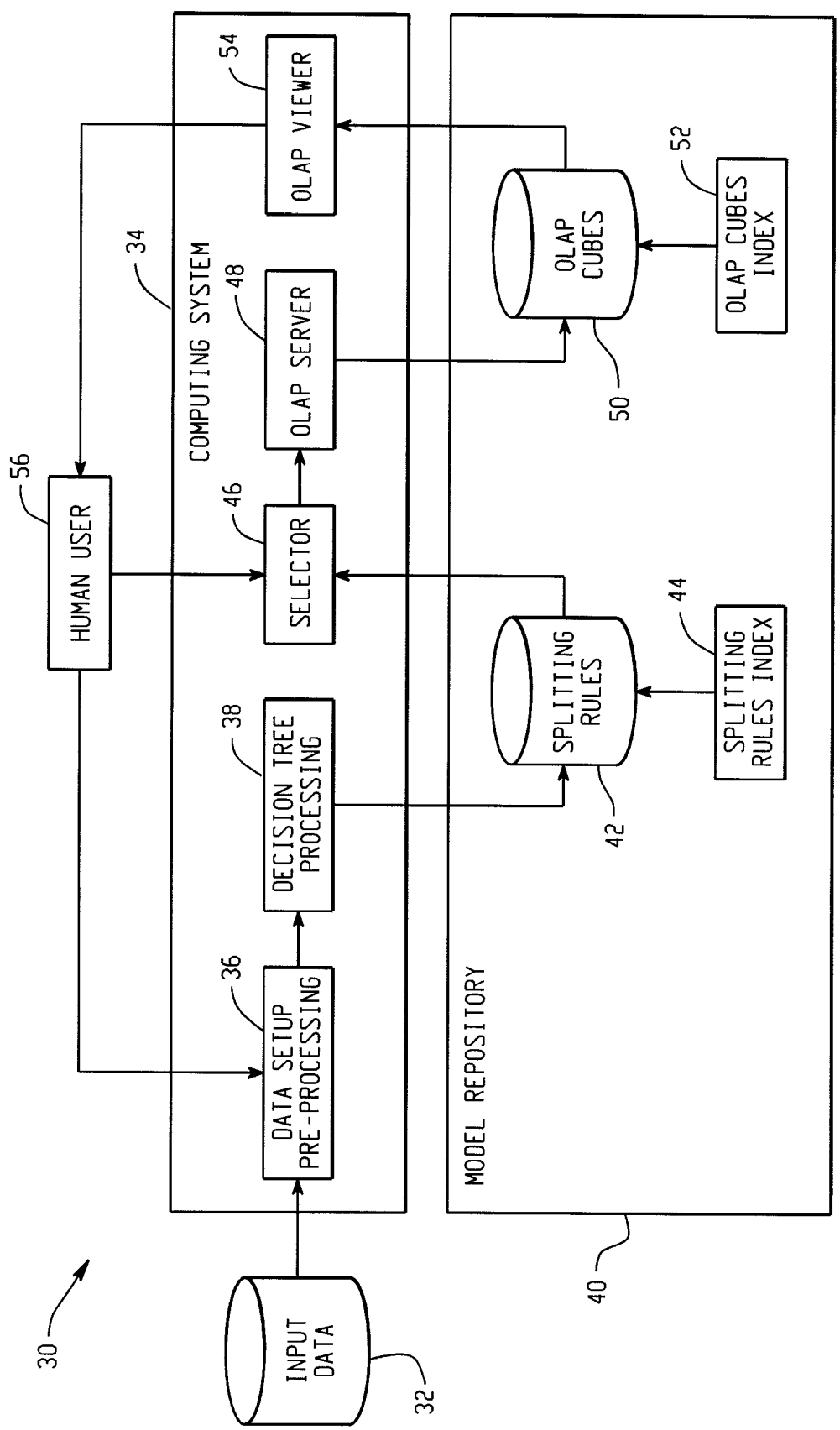
FIG. 1 is a system diagram depicting computer-related components used by the present invention.

FIG. 1 is a system block diagram that generally shows at 30 the computer-implemented components of the present invention. The present invention processes input data 32 to automatically determine dimensions that best predict preselected target(s). The results are displayed to the user 56 through an On-Line Analytical Processing (OPAL) viewer 54.

The computing system 34 of the present invention receives the input data 32. The input data may be a data table containing variables, some of which are dimension variables, and one or more of which can be used as target variables. For example, a study may have been conducted for a company to analyze the purchasing habits of the company's customers. The study may have gathered data related to such dimension variables as the frequency that a customer has ordered from the company's catalog, the total amount the customer spent for a purchase, or what type of products the customer has purchased. An example of a target variable is a variable that indicates whether a customer has purchased an item.

The computing system 34 of the present invention contains a data setup pre-processing module 36, which enables the user to specify target variable(s) and possibly reformat the input data. For example, reformatting may be used to eliminate certain dimension variables which the user knows beforehand will not be needed.

The input data 32 is analyzed by the decision tree processing module 38 of the present invention. The model produced by the decision tree processing module 38 identifies the variables in the data that best predict the outcome of the transactions as represented by the values of the target variable. The model also specifies how to group the values of each of these variables to best predict the outcome. The model specifies this through splitting rules. The splitting rules indicate the values at which the data is split into various groups. The splitting rules may be stored in a data store 42 of a model repository 40.

Splitting rules indexes 44 are provided in the model repository 40 so that the user 56 may more easily determine which splitting rules are used for which models. The model repository 40 is described in greater detail below.

The present invention creates class variables based on these groupings (as determined from the splitting rules) of the identified variables and recommends them for use as OPAL dimensions. These newly created class variables generated by the decision tree processing module 38 are termed "recommended variables" or "recommended dimensions".

The present invention may use a decision tree processing module from a data mining application. The data mining application may be, for example, Enterprise Miner™, from SAS Institute Inc. of Cary, N.C., from which the present invention uses a competing initial splits method. Alternatively, other types of data mining programs and other types of decision tree processing methods may be utilized with the present invention.

The user 56 may use a selector module 46 to alter which dimensions should be used to group the data. For example, the decision tree processing module 38 may recommend five dimension variables to split or group the data. However, the user 56 may have a special interest in another dimension variable and elect to use it in combination with the five recommended dimensions to group the data. The user may also remove one or more of the five recommended dimension variables and add one or more of the dimension variables that were not automatically recommended by the decision tree processing module 38.

The dimension variables that are to be used to group the data are sent to an OPAL computer server 48 that generates OPAL cubes 50 to be stored in the model repository. An OPAL cube is an n-dimensional representation of the grouped data and can be implemented as a multi-dimensional database (MDDB). The representation may be in a tabular format (i.e., data tables or data sub-tables) or graphical format. An OPAL viewer 54 displays the OPAL cubes 50 to the user 56. An OLAP cubes index 52 is provided in the model repository 40 so that the user 56 may more easily determine which dimensions and other data are used within an OLAP cube.

In this manner, the present invention allows a marketing analyst (i.e., a non-technical individual) who may not be interested in the details of the decision tree algorithm to view automatically the determined data groupings with the OLAP viewer 54. The marketing analyst is now able to examine data that may contain hundreds of dimensions because the data is automatically and intelligently grouped by the present invention.

FIGS. 2-7 are graphical user interfaces in which the user customizes the present invention to his or her preference (i.e., the windows where the user specifies the "Settings"). Within these windows the user may designate dimension variables as input to the present invention, modify or view the split values of the recommended dimension variables, request that certain statistics be computed on the target variable, and specify which sub-tables of the present invention to create.

Figure 2:
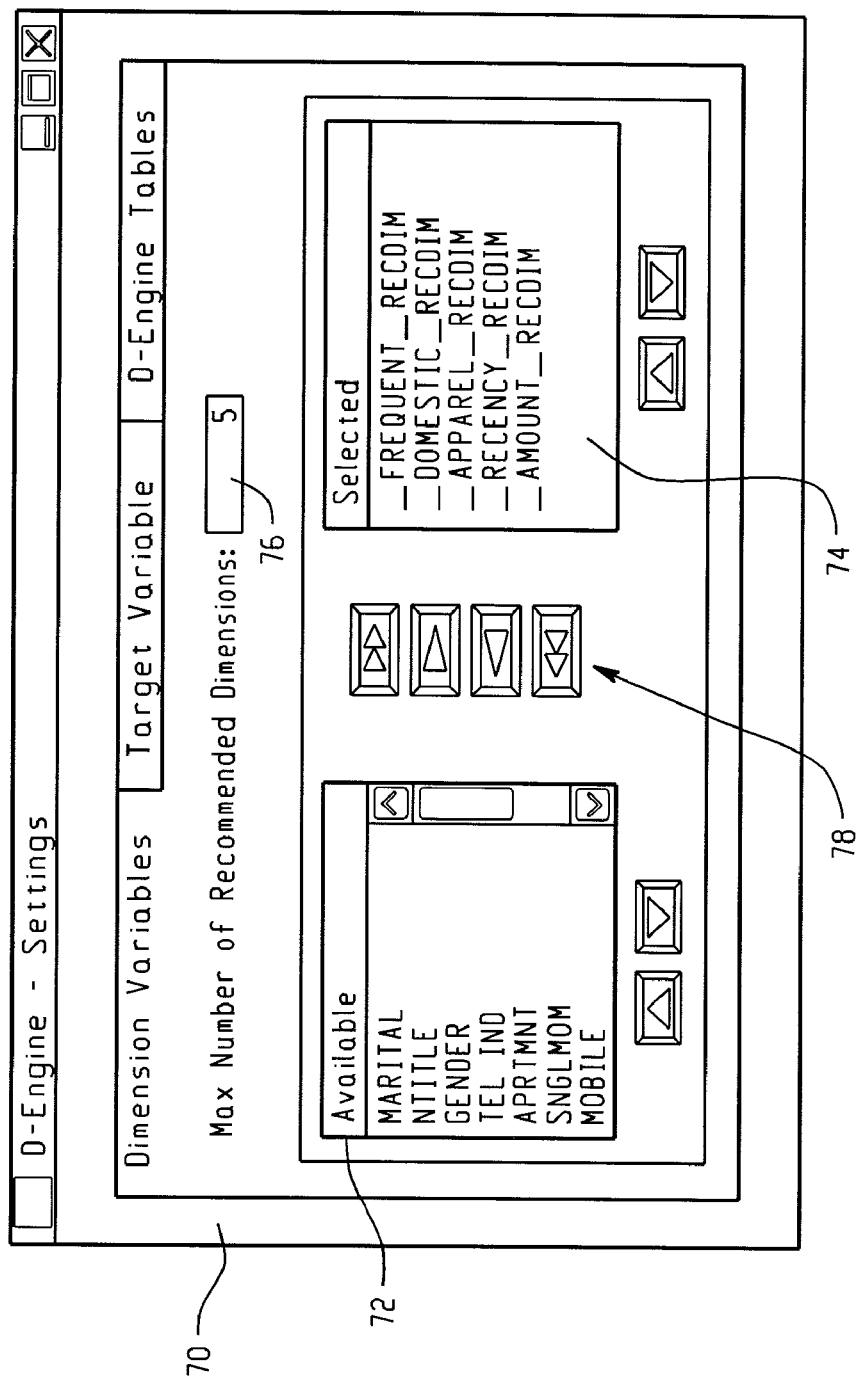
FIG. 2 is a graphical user interface of the dimension variables selection tab on the dimension engine ("D-Engine") settings window.

FIG. 2 is a graphical user interface of the dimension variables selection window 70. This window 70 enables the user to designate which variables should be used as dimension variables. The non-target categorical variables from the input data are automatically displayed in the Available region 72. The variables recommended by the decision-tree algorithm are automatically placed in the Selected region 74. Variables in both regions 72 and 74 are valid dimensions for use in the present invention.

To determine the recommended variables to place in the Selected region 74, the present invention uses the competing initial splits method of the decision tree processing module from the Enterprise Miner™ product or software. This method chooses the most important splitting variables and recommends them as dimensions. By default, the decision tree processing module suggests five recommended variables as shown by reference number 76. In other embodiments of the present invention, the decision tree processing module may produce many splitting variables. However, the default number of five prevents producing excess recommended variables with low predictive abilities. This default number of recommended variables (in addition to other settings described in FIG. 6 and FIG. 7) may be changed by the user in a separate default settings window, which is utilized for customizing the D-Engine settings to default values desired by the user. If the user desires more or fewer recommended variables from the decision tree processing module while in FIG. 2, the user enters that number in the "Max Number of Recommended Dimensions" field 76. The present invention then automatically updates the Selected region 74 with the corresponding number of recommended variables requested by the user.

The user can move the categorical variables from the Available region 72 to the Selected region 74 using the arrows 78. The user may also choose to move the automatically selected recommended variables back to the Available region 72 using the arrows 78 if the user does not want those variables as dimensions in the MDDB. The user should choose the variables he or she considers valuable to the enterprise and place them in the Selected region 74. Each variable placed in the Selected region 74 by the user (if any), along with each recommended variable placed in the Selected region 74 by the present invention, is available for use as a dimension variable in the MDDB. The present invention provides certain statistics to assist the user in determining whether the recommended variables are valuable enough to be used as dimensions in the MDDB as shown in FIG. 3.

Figure 3:
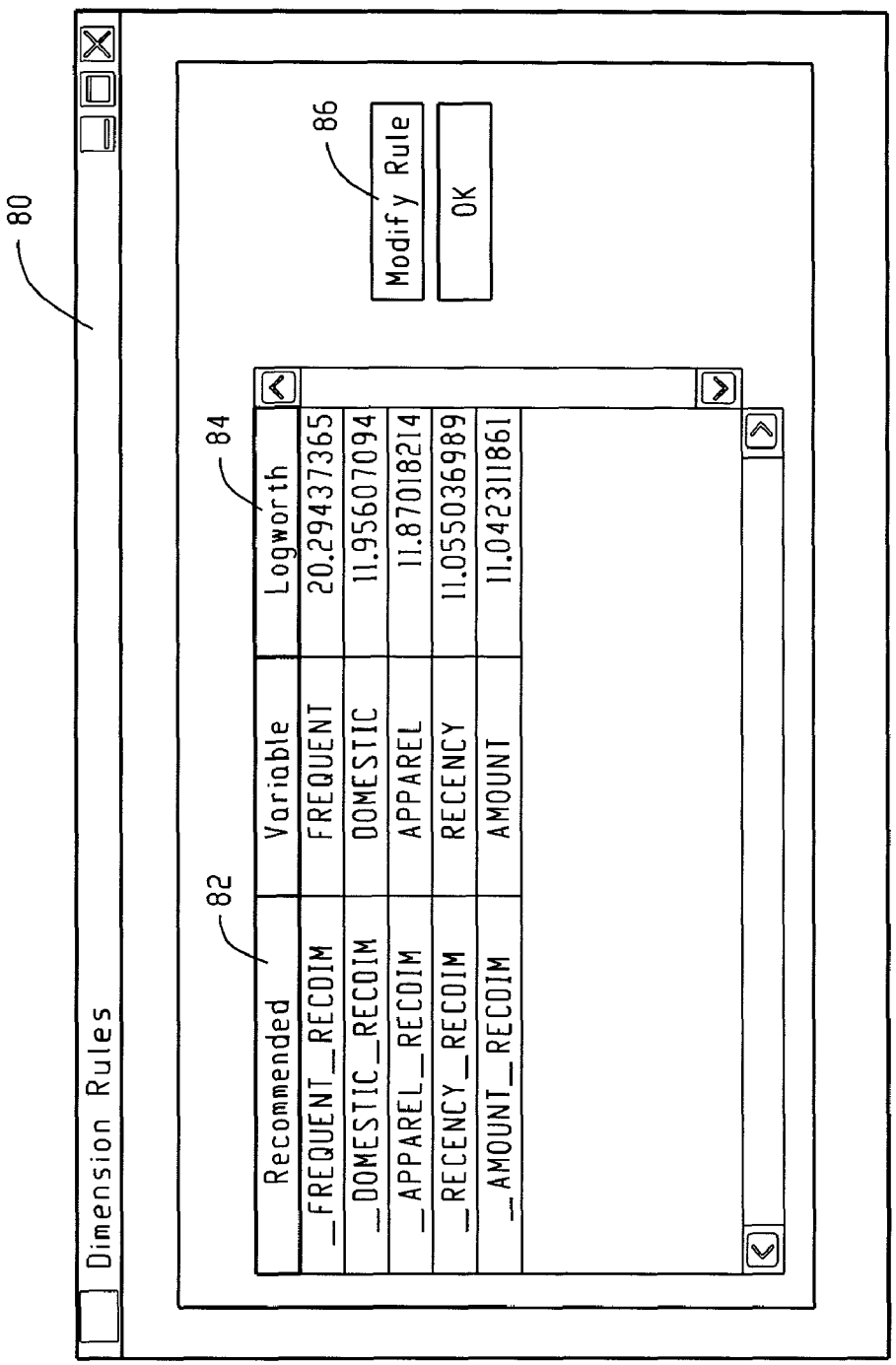
FIG. 3 is a graphical user interface that depicts the recommended dimensions and their associated logworths, as displayed before the run.
Figure 4:
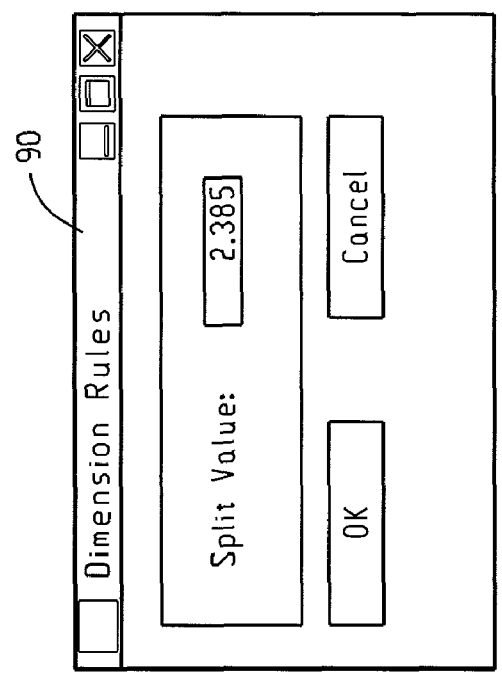
FIG. 4 is a graphical user interface that depicts the editable split value of a recommended dimension that is based on an interval input variable, as displayed before the run.
Figure 5:
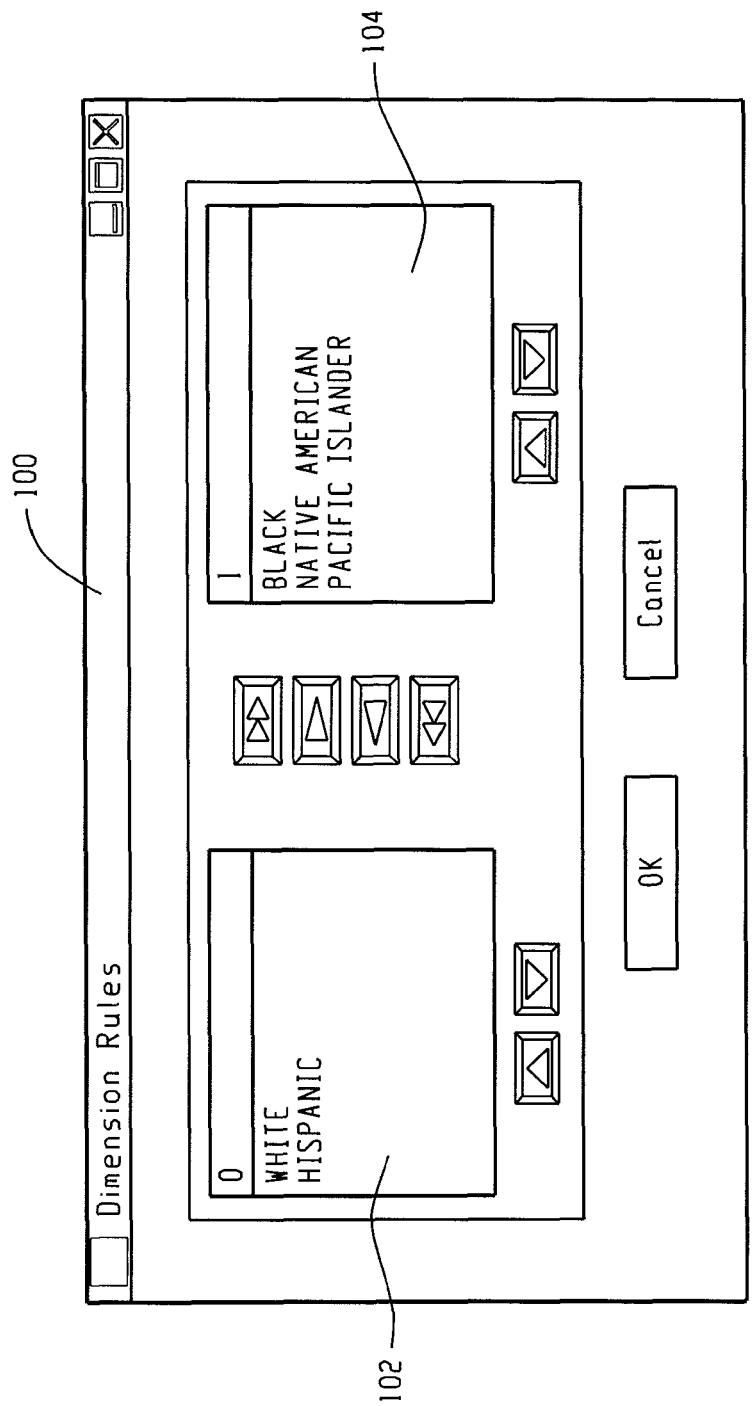
FIG. 5 is a graphical user interface that depicts the editable split value of a recommended dimension that is based on a categorical input variable, as displayed before the run.

FIG. 3 is a graphical user interface depicting the recommended variables 82 and their associated logworths 84 in window 80. The logworth of a recommended variable is a measure of the strength of the corresponding rule generated by the decision tree processing module. For a categorical target variable, logworth is defined as logworth=−log(p-value from the chi-square test). For an interval target variable, logworth is defined as logworth=−log(p-value from the F test). "Good" splitting variables are ones that have large values of logworth. By viewing window 80, the user can determine if each recommended variable's logworth has enough strength desired by the enterprise to be used as a dimension variable for grouping the data. In other words, the user might remove from the Selected region (of FIG. 2) a recommended variable that was distinctly worse in predictive ability than the ones above it in the list (of FIG. 3). Or, the user might choose to create more recommended variables (by entering a larger number for the "Max Number of Recommended Dimensions" field in FIG. 2) if each recommended variable had a significant logworth. If the user selects a recommended variable and activates the "Modify Rule" button 86, then either the window of FIG. 4 or FIG. 5 is displayed depending on the type of the selected variable. If the user overrides the split values obtained by the competing initial splits method for a particular recommended variable, as shown in FIG. 4 and FIG. 5, the logworth for that variable is updated accordingly.

FIG. 4 is a graphical user interface of the split value of a recommended dimension based on an interval input variable. In this window 90 the user can view the split value determined by the decision tree processing module. In this case the decision tree processing module determined, in order to best predict the target variable, that this interval variable should be split at the value 2.385. If the user would like the variable split at a different location, the user may type in a different split value. When the present invention processes this data, this recommended variable will receive a value "0" where the variable on which it is based has a value that is less than the split value, and a value of "1" where the variable on which it is based has a value that is greater than or equal to the split value.

FIG. 5 is a graphical user interface of the split value of a recommended dimension based on a categorical input variable. In window 100 for this example, the decision tree processing module has determined, in order to best predict the target variable, that "White" and "Hispanic" belong in one grouping 102, and "Black", "Native American", and "Pacific Islander" belong in another grouping 104. If desired, the user may arrange the values in the two groupings in his or her own user-defined manner. When the present invention processes this data, the recommended variable will receive a value "0" if the observation in the data set is beneath the "0" region 102, and a value of "1" if the observation in the data set is beneath the "1" region 104.

Figure 6:
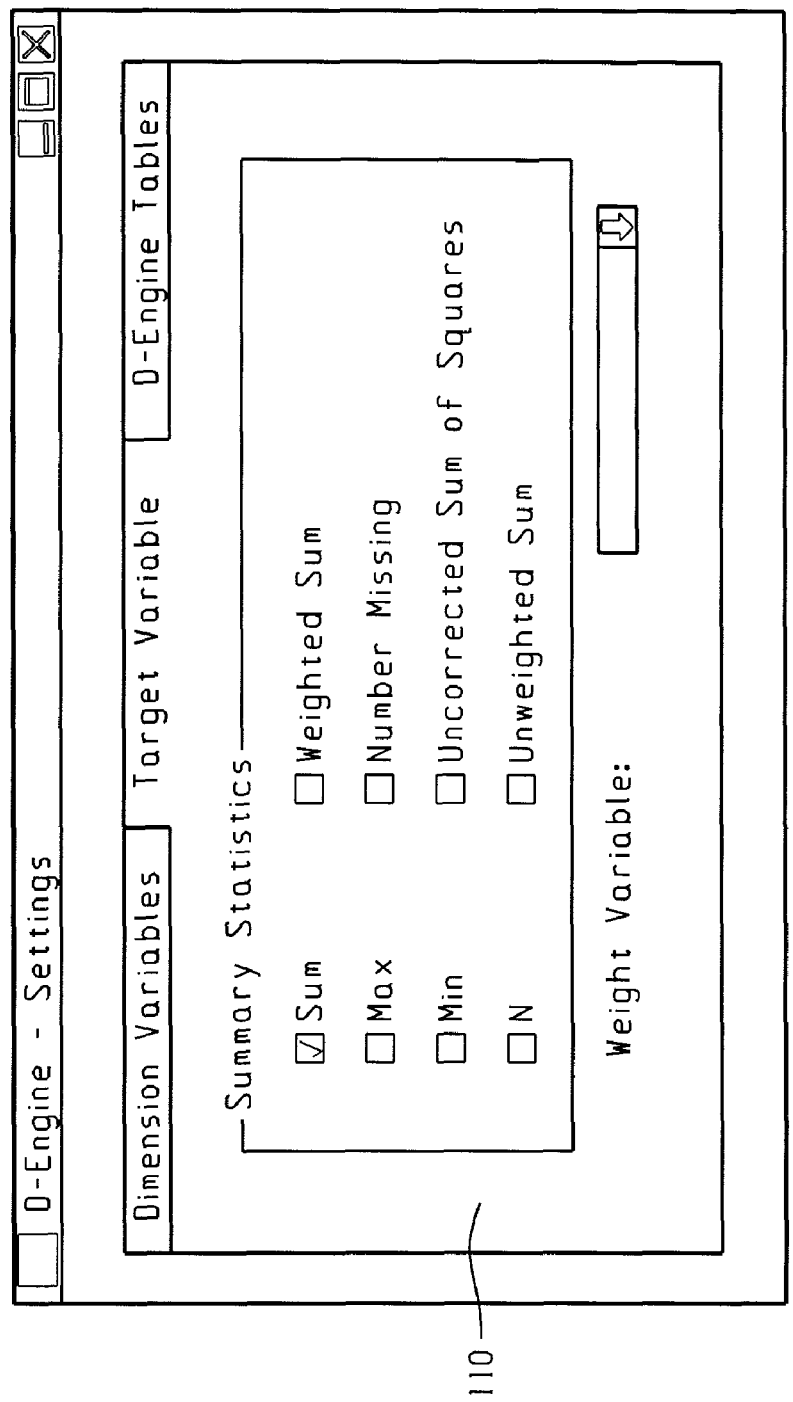
FIG. 6 is a graphical user interface that depicts the target variable statistics tab on the D-Engine settings window.

FIG. 6 is a graphical user interface of the target variable statistics window 110 of the present invention. The user-designated target variable from the input data is also used as the target analysis variable in the MDDB. The user selects the summary statistics that he or she would like to have computed based on the determined data groupings. In an alternate embodiment more statistics are displayed when viewing the MDDB sub-tables. These statistics are computed from the stored statistics within the MDDB each time a sub-table is displayed.

Figure 7:
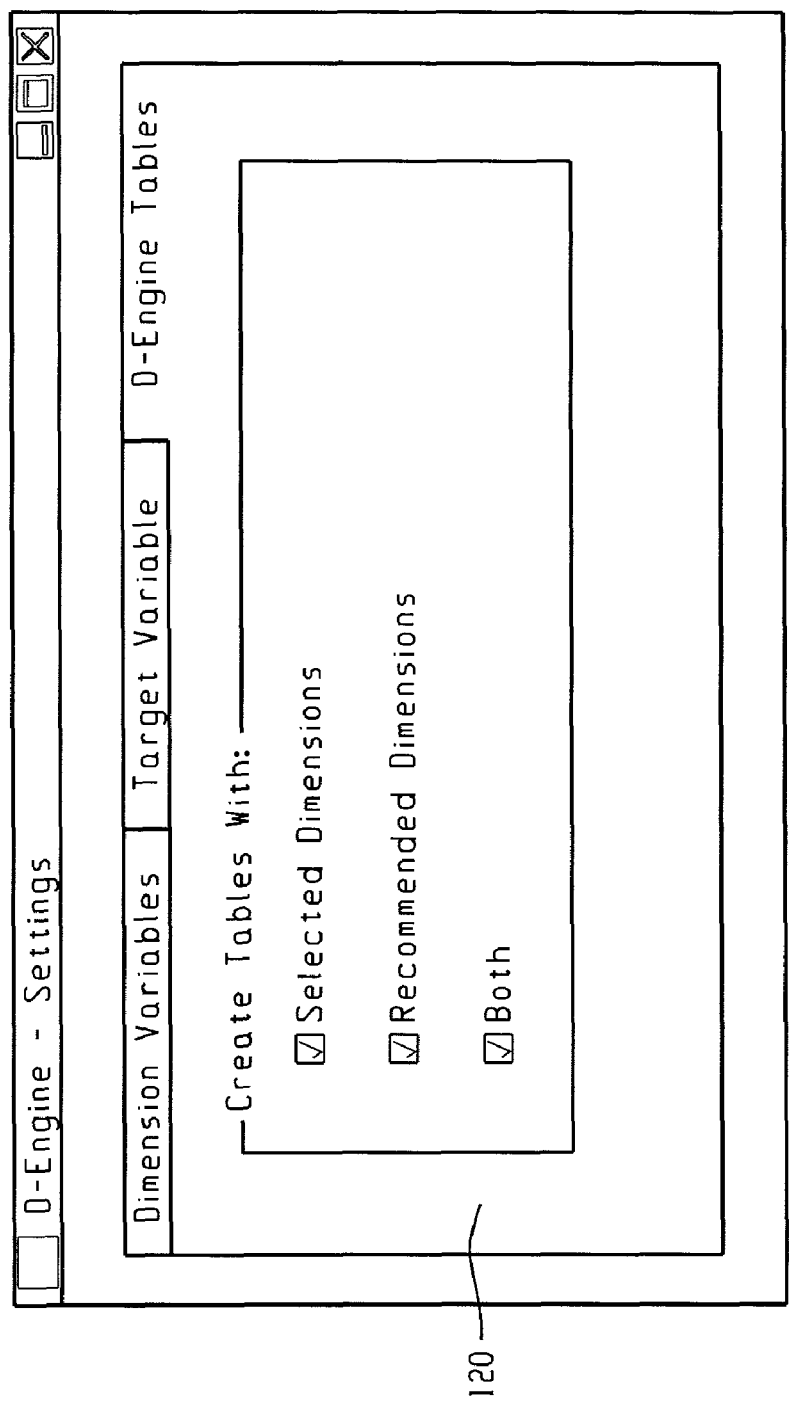
FIG. 7 is a graphical user interface that depicts the dimension engine tables tab on the D-Engine settings window.

FIG. 7 is a graphical user interface of the OLAP tables window 120. The present invention creates a OLAP cubes data store and the user may choose to create one or more sub-tables from the OLAP cubes data store of the following types:

(a) "Selected Dimensions": this sub-table will use dimension variables as listed in the Selected region 74 on the Dimension Variables tab of FIG. 2.

(b) "Recommended Dimensions": this sub-table will use only the recommended dimensions.

(c) "Both": this sub-table will use dimension variables as listed in the Selected region 74 of the Dimension Variables tab, in addition to any variables which may have been moved to the Available region 72 of the Dimension Variables tab of FIG. 2.

Exemplary results are depicted in FIGS. 8-14. The results windows display exemplary sub-tables and a graph of the data based on the specifications in the Settings windows. From the results windows, the user may also view the splitting values used to define the recommended variables. The exemplary results analyze sample data from a department store catalog, with the target variable being whether the customer decided to purchase one or more products from the store catalog.

FIG. 8 is a graphical user interface 130 of the results obtained by using non-recommended dimension variables as solely selected by the user. Each record in the sample data represents a successful transaction, (i.e., a catalog mailing that resulted in a purchase), or an unsuccessful transaction (i.e., a catalog mailing that did not result in a purchase). The variables that represent the user-selected OLAP dimensions are "Statecode" 132 and "Gender" 134. The top horizontal header 132 identifies the code for the state. The left vertical header 134 identifies the gender of the transactor. The bottom horizontal header 136 identifies the purchase statistics with SUM representing the total number of successful transactions in each state, and N representing the total number of successful and unsuccessful transactions in each state. One would appreciate that because of the large number of buckets, it is difficult to obtain any meaningful information from this representation.

In the case described above, which demonstrates the disadvantageous non-recommended dimension approach, the class variables "Statecode" and "Gender" from the data set were the only variables designated in the Selected region 74 of FIG. 2, thus they are the only two variables in the sub-table that are displayed in FIG. 8. Within the present invention, any combination of class variables from the data set and recommended variables from the decision tree processing module may be designated for this sub-table by placing these desired variables in the Selected region 74 (of FIG. 2).

FIG. 9 is a graphical user interface 140 of the results using the present invention's recommended dimensions for the same data that was utilized in FIG. 8. This sub-table contains every recommended variable 82 created by the competing initial splits method. In this case, the decision tree processing module recommends using the following variables as dimensions:

(a) _DOMESTIC_RECDIM 142: if the customer purchased <3.5 domestic products, then _DOMESTIC_RECDIM=0, otherwise=1.

(b) _APPAREL_RECDIM 144: if the customer purchased <1.5 apparel products, then _APPAREL_RECDIM=0, otherwise=1.

(c) _RECENCY_RECDIM 146: if the customer has not ordered a product from the catalog within the last 174 days, then _RECENCY_RECDIM=0, otherwise=1.

(d) _AMOUNT_RECDIM 148: if the amount of the customer's purchase was <$538.50, then _AMOUNT_RECDIM=0, otherwise=1.

(e) _FREQUENT_RECDIM 150: if the number of times the customer has ordered from the catalog is <2.385, then _FREQUENT_RECDIM=0, otherwise=1.

The top four horizontal headers are for _DOMESTIC_RECDIM 142, _APPAREL_RECDIM 144, _RECENCY_RECDIM 146, and _AMOUNT_RECDIM 148 and are formatted to reflect the split value for each variable. The left vertical header is for _FREQUENT_RECDIM 150, and is formatted to reflect the split value for the variable. The bottom horizontal header 136 identifies the purchase statistics. SUM represents the total number of successful transactions and N represents the total number of successful and unsuccessful transactions.

In the market segments that are shown in FIG. 9, the largest number of successful transactions (which is "228") is in the market segment that bought a relatively small amount of domestic goods, bought a relatively small amount of apparel, has not put in another order relatively recently, paid a relatively small amount, and ordered from the catalog a relatively small number of times.

In the market segments that make the highest number of purchases ("228", "139", and "118"), the highest ratio of purchases (SUM/N: 38%, 46%, 58%), 58%, is in the market segment that ordered from the catalog fairly recently (put in another order relatively recently), and ordered from the catalog frequently (ordered from the catalog a relatively large number of times). A marketing analyst could develop useful strategies from this kind of information.

FIG. 10 is a graphical user interface 160 of the results, based on the same data as in FIGS. 8 and 9. This sub-table includes any class variables from the input data that were moved to the Selected region 74 of FIG. 2, in addition to each recommended variable from the decision tree processing module.

Figure 11:
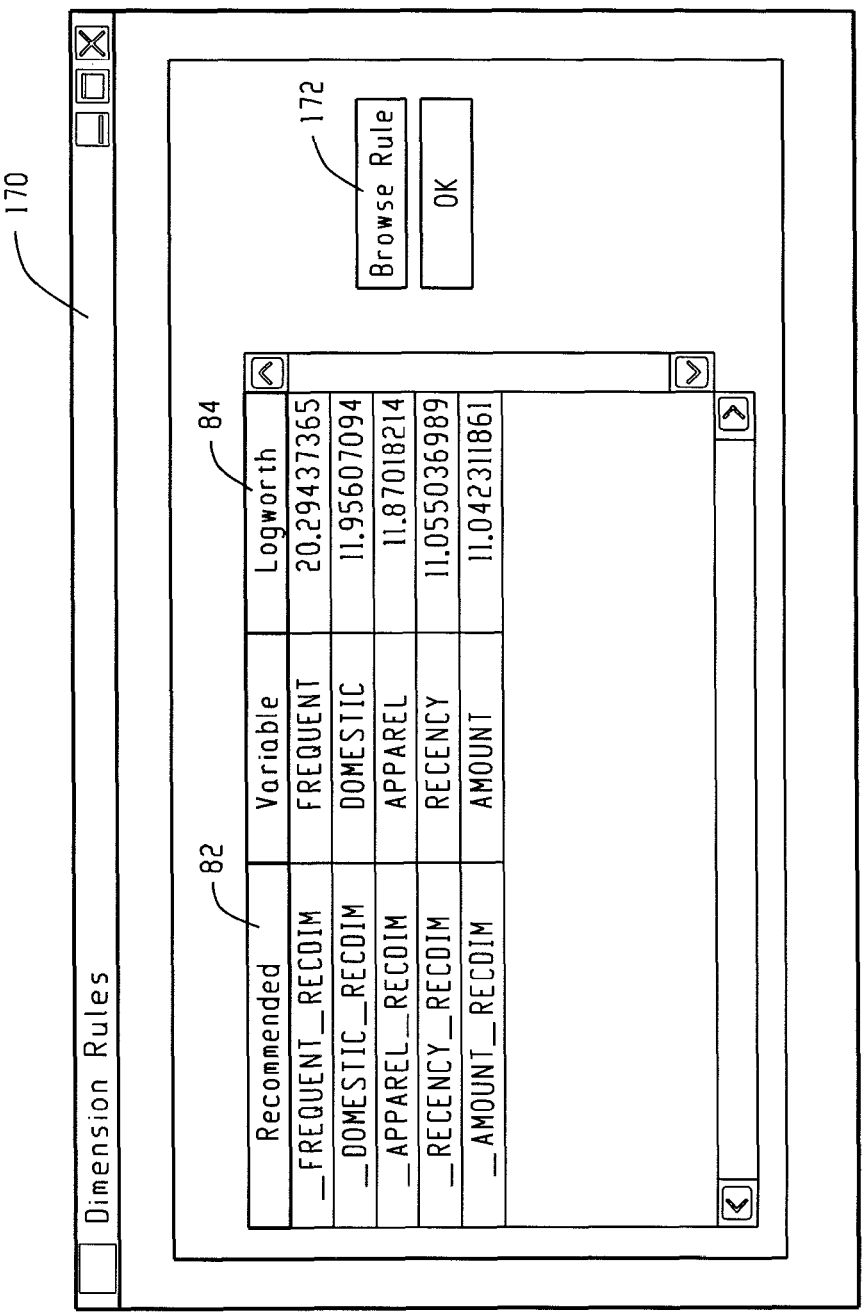
FIG. 11 is a graphical user interface that depicts the recommended dimensions and their associated logworths, as displayed after the run.

FIG. 11 is a graphical user interface of the recommended variables and their associated logworths. This window 170 is identical to the one in FIG. 3 and is accessed by selecting the Pmenu View, then selecting Dimension Rules (when looking at the results from the run). After selecting a recommended variable, the "Browse Rule" button 172 displays the window of FIG. 12 or FIG. 13 depending on the type of the selected variable.

Figure 12:
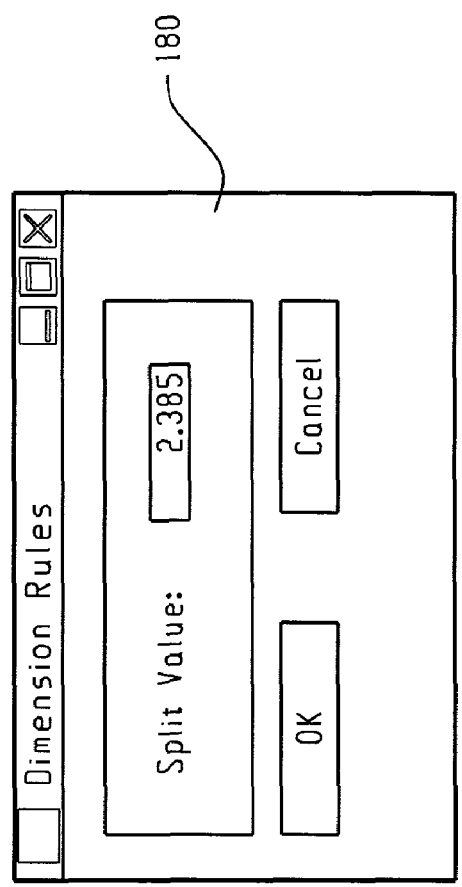
FIG. 12 is a graphical user interface that depicts the split value of a recommended dimension based on an interval input variable, viewed from the present invention's results, as displayed after the run.

FIG. 12 is a graphical user interface 180 of the split value of a recommended dimension based on an interval input variable. The split value is viewed by the user, and is helpful in allowing the user to see what rule was used when creating the recommended variable.

Figure 13:
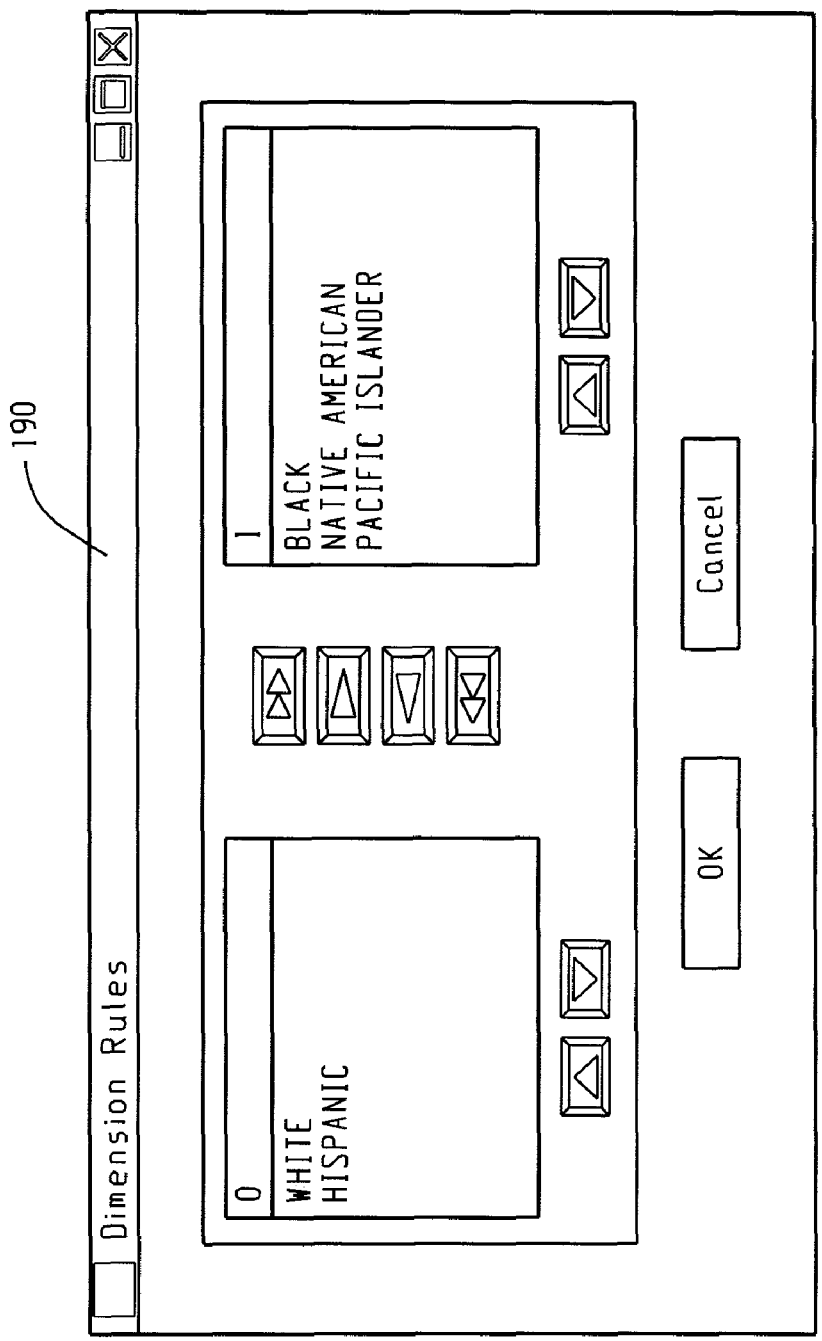
FIG. 13 is a graphical user interface that depicts the split value of a recommended dimension based on a categorical input variable, viewed from the present invention's results, as displayed after the run.

FIG. 13 is a graphical user interface 190 of the split value of a recommended dimension based on a non-interval input variable. The split value is viewed by the user, and is helpful in allowing the user to see what rule was used when creating the recommended variable.

Figure 14:
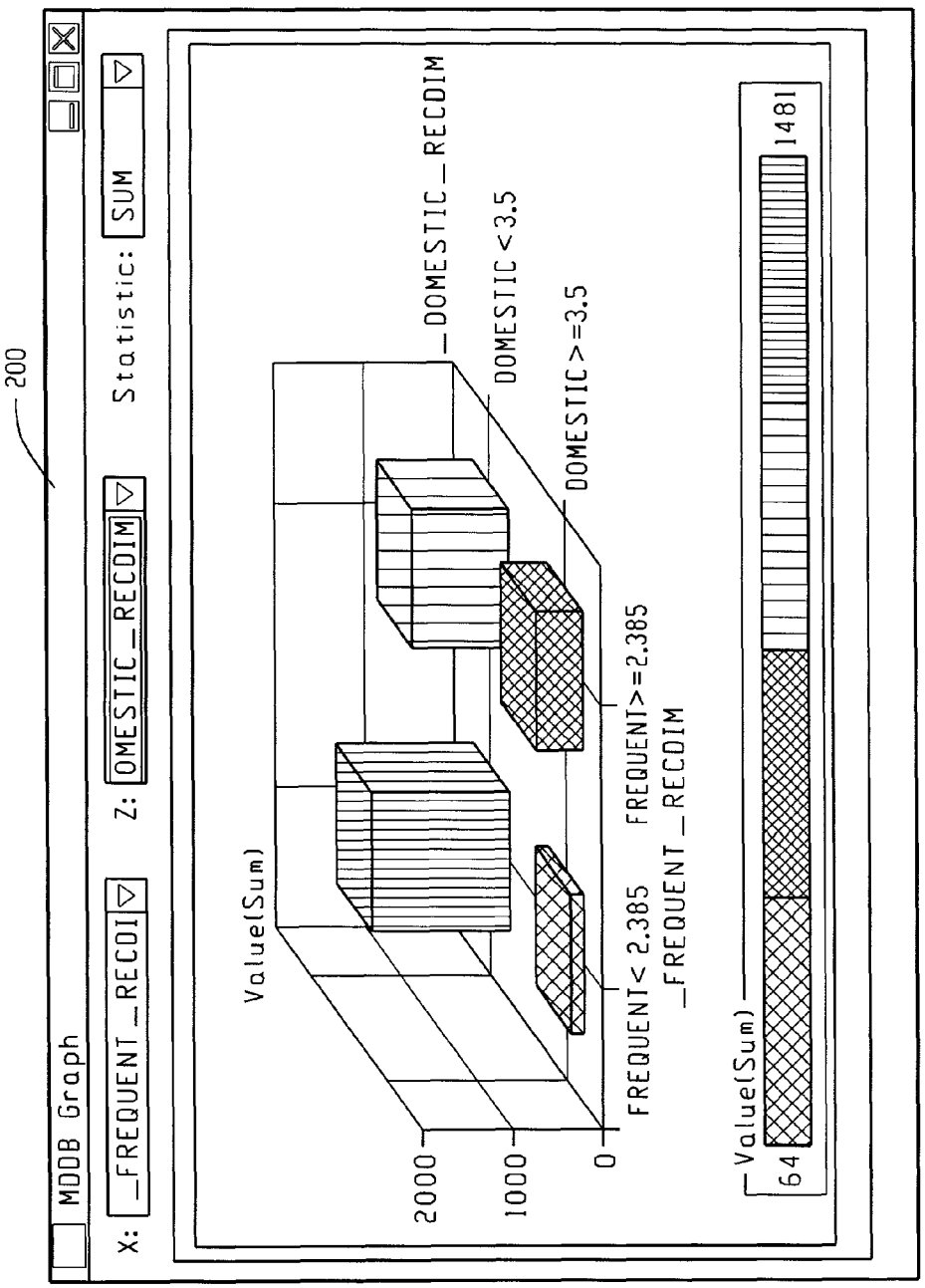
FIG. 14 is a multidimensional bar chart that graphically depicts the exemplary results of the present invention.

FIG. 14 is one of the graphical user interfaces 200 of the data in the OLAP cube data store, displayed as a multidimensional bar chart. The recommended dimension variable with the largest logworth is automatically selected as the horizontal axis variable. The recommended variable with the second largest logworth is automatically selected as the forward axis variable. The user may change the horizontal and forward axis variables by choosing any of the variables used to create their MDDB from the designated drop down boxes. The vertical axis refers to one of the statistics computed by the MDDB. The vertical axis may also be changed to one of the other statistics which was chosen to be stored in the MDDB (from FIG. 6).

Figure 15A:
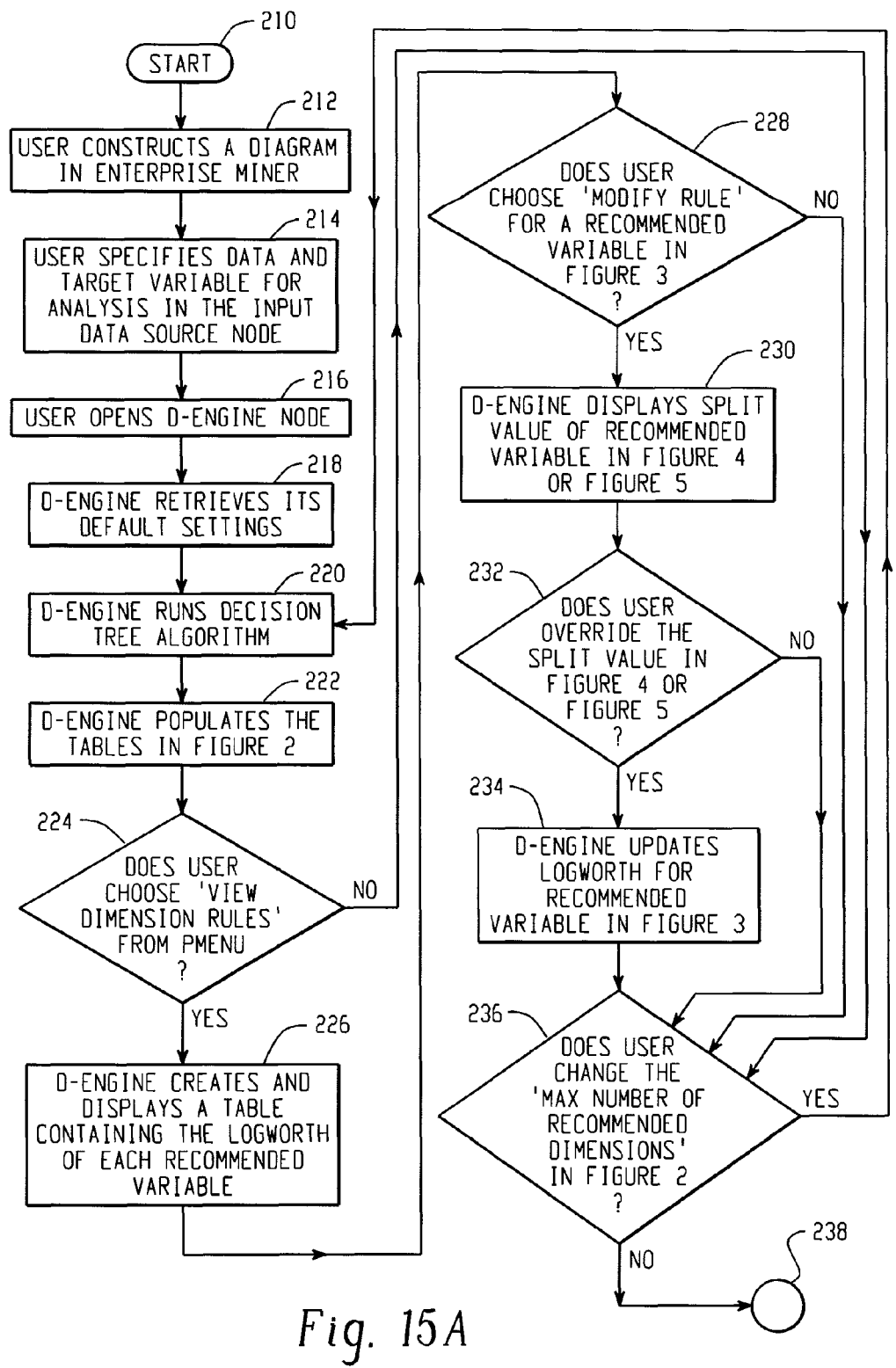
FIGS. 15A and 15B are flow charts that depict exemplary steps for building the dimension engine of the present invention.
Figure 15B:
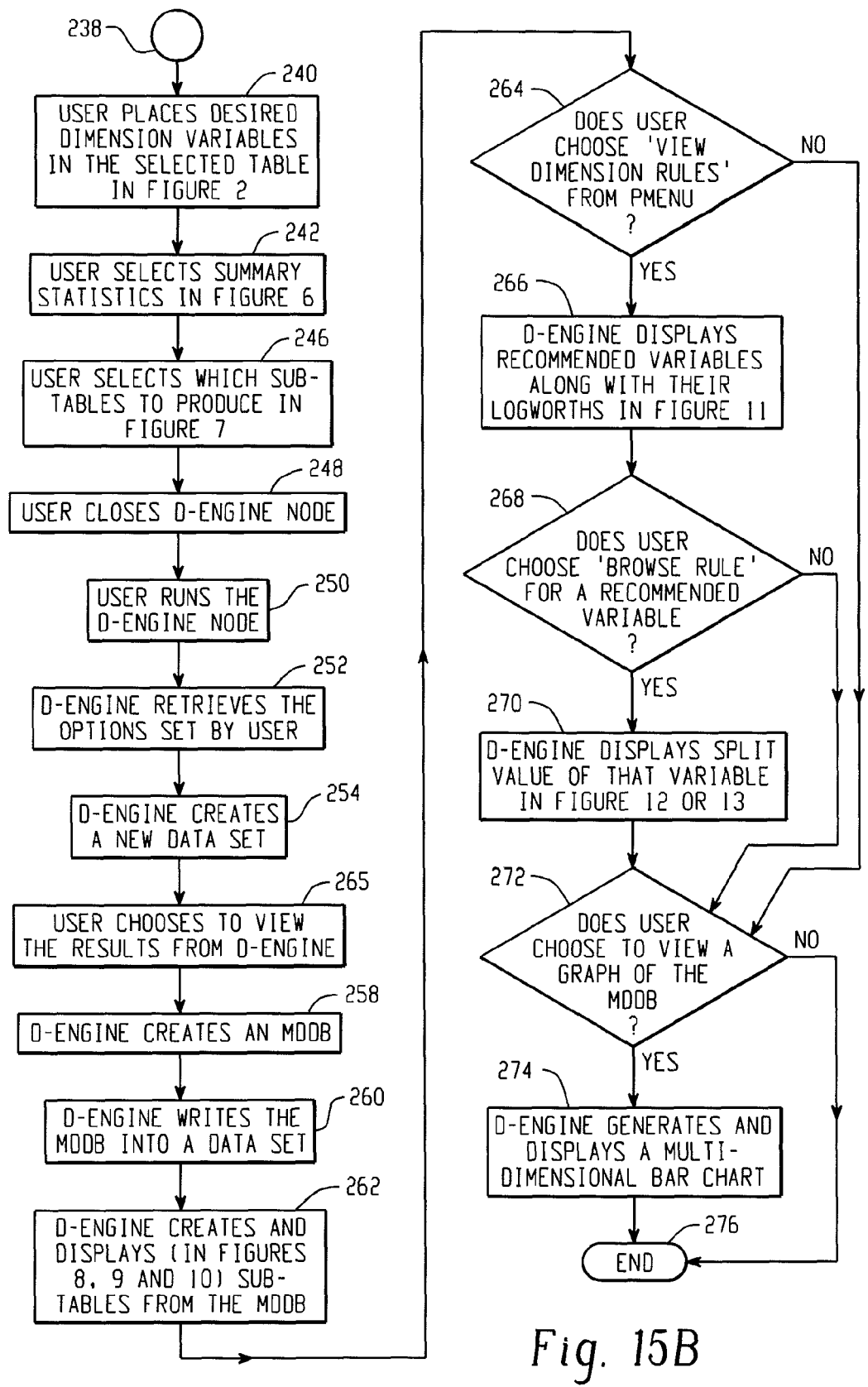

FIGS. 15A and 15B are flow charts depicting steps for automatically determining dimensions that best predict the values of a preselected target variable. With reference to FIG. 15A, start block 210 indicates that at step 212 the user invokes Enterprise Miner™ to construct a process flow diagram for the purpose of data mining. Enterprise Miner™ contains a graphical user interface (GUI) for data mining, which allows construction of a process flow diagram. Enterprise Miner™ contains a collection of sophisticated statistical analysis nodes which the user can connect together to form the process flow diagram. In one embodiment, the present invention has been implemented as a node within Enterprise Miner™. However, it should be understood that the present invention can be implemented with computer statistical systems other than Enterprise Miner™.

At step 214, the user specifies an input data set and a target variable within the data set. At step 216, the user opens the D-Engine node by double clicking on the node in the diagram. Step 218 retrieves the default settings. The user may change the default settings of the present invention if desired (in a separate D-Engine window created solely for designating default values) before creating the process flow diagram.

At step 220, the present invention runs the decision tree algorithm using the competing initial splits method. The competing initial splits method runs the decision tree algorithm (using the SPLIT procedure from SAS Institute Inc.) with the maximum depth of the tree set equal to 1, the maximum branches for each split variable in the tree set equal to 2, and the maximum number of rules to produce set equal to the value for the 'Max Number of Recommended Dimensions' field 76 (of FIG. 2). Using this method, the decision tree algorithm produces an initial binary split variable, meaning the decision tree identifies the most important predictor variable from all of the input variables, and specifies how to best group the values of that variable. It also computes the competing split variables, along with the splitting rules for grouping the data for these competing variables. The total number of competing split variables produced is determined by the number set for the 'Max Number of Recommended Dimensions' field 76 (of FIG. 2). The competing split variables are generated in order of importance. Thus, the initial split variable is the most important variable in predicting the target. The first competing split variable is the second most important variable in predicting the target. The second competing split variable is the third most important variable in predicting the target, and so on. The present invention obtains the initial split variable along with its split value, and each competing split variable along with its split value. These split variables and their associated values are the recommended variables that the present invention suggests to use as dimensions in the MDDB. The present invention generates a name for each split variable found. Each initial split variable and competing split variable is given the name _VARNAME_RECDIM where VARNAME is the name of the corresponding input variable, and RECDIM stands for recommended dimension.

At step 222, the present invention populates the Available and Selected regions (as displayed in FIG. 2). The present invention places the categorical variables from the input data set in the Available region 72. The present invention places the recommended dimension variables in the Selected region 74.

At step 224, the user may choose to view or override the rules used to create the recommended variables, in addition to viewing the predictive ability of each recommended variable. If so, the user may select View, Dimension Rules from the Pmenu. If the user does not make such a selection, then processing continues at decision block 236 wherein the user decides whether to change the 'Max Number of Recommended Dimensions' (of FIG. 2).

However, if at decision block 226, the user does make such a selection, then block 226 creates and displays a table containing the logworth of each recommended variable (as displayed in FIG. 3). The table includes each recommended variable 82 along with that recommended variable's associated logworth 84 in addition to the name of the corresponding input variable.

Decision block 228 examines whether the user chooses to modify the rule for a recommended variable (as described in FIG. 3). If the user does not choose to modify the rule, then processing continues at decision block 236 wherein the user decides whether to change the 'Max Number of Recommended Dimensions' (of FIG. 2).

However, if at decision block 228, the user does choose to modify the rule, then block 230 identifies which recommended variable has been selected to modify. The present invention then determines from the _GET_RULESET_ method of the SPLITS class the groupings of the values in that recommended variable. If the recommended variable is based on an interval variable, the present invention displays the split value which defines the groupings (as shown in FIG. 4). If the recommended variable is based on a categorical variable, the present invention displays the split values which defines the groupings (as shown in FIG. 5).

At decision block 232, the user may choose to override the split values (as shown in the windows of FIGS. 4 and 5) for the corresponding recommended variables. The user does so by typing in a new value (in FIG. 4), or using the arrows to manipulate the values (in FIG. 5). If the user does choose to override the split values, then process block 234 retrieves the overridden, user-defined, split value. Block 234 uses the new split value to update the logworth of the corresponding recommended variable (as shown in FIG. 3) by using the method _EVALUATE_RULE_ from the SPLITS class.

However, if the user does not override the split value, then processing continues at decision block 236 wherein the user decides whether to change the 'Max Number of Recommended Dimensions' (of FIG. 2). At decision block 236, the user may choose to increase or decrease the number of recommended dimensions. If this change is desired, the user should place his or her desired number in the 'Max Number of Recommended Dimensions' field in the window (shown in FIG. 2) and return to process block 220 to rerun the decision tree algorithm. If this change is not desired, then processing continues on FIG. 15B at block 240.

With reference to FIG. 15B, block 240 allows the user to arrange the variables such that the variables in the Selected region 74 (of FIG. 2) are the variables for which dimensions are desired within the MDDB. At block 242, the user selects one or more summary statistics for the analysis of the target variable (as shown in FIG. 6).

At block 246, the user selects which MDDB sub-tables to build (as shown in FIG. 7). At block 248, the user closes the D-Engine node. At this point, the user has specified the MDDB that he or she would like to create. At block 250, the user runs the present invention node by right mouse clicking the node in the diagram and choosing 'Run'. Block 252 retrieves the options set by the user (from FIG. 2 through FIG. 7).

Block 254 creates a new data set. This data set includes all of the input variables and their values from the specified data set, in addition to the recommended variables and their values determined by the present invention. The new data set is constructed in the following manner. For each recommended variable, the split value is obtained by the present invention. This split value may be the original value found by decision tree algorithm, or a user-defined split value (as created through decision block 232 of FIG. 15A).

If the recommended variable was based on an interval input variable, the split value will be a number (in this case, 2.385). The present invention creates code similar to the following example (of FIG. 4):

If VARNAME=. then _VARNAME_RECDIM=(0 or 1);
Else if VARNAME<2.385 then _VARNAME_RECDIM=0;
Else_VARNAME_RECDIM=1;

Because the decision tree algorithm determines to which branch the missing value is assigned, if the variable in the input data set is missing, the corresponding new recommended variable will receive a value of 0 or 1 (0 if the missing value is in the first branch, and 1 if the missing value is in the second branch). If the variable in the input data set is less than 2.385, then the corresponding new recommended variable will have a value set equal to 0. If the variable in the input data set is greater than or equal to 2.385, then the corresponding new recommended variable will have a value of 1.

If the recommended variable was based on a non-interval input variable (categorical variable), the values of the input variable will be placed in two groups. For this situation, the present invention creates code similar to the following example (of FIG. 5):

If VARNAME in " " then _VARNAME_RECDIM=(0 or 1);
Else if VARNAME in ("WHITE" "HISPANIC") then _VARNAME_RECDIM=0;
Else _VARNAME_RECDIM=1;

If the variable in the input data set is missing, the corresponding new recommended variable is set equal to 0 or 1 as determined by which branch it was assigned by the decision tree algorithm. If the variable in the input data set is "WHITE" or "HISPANIC" then the corresponding new recommended variable is set equal to 0. If the variable in the input data is anything but "WHITE" or "HISPANIC" (excluding missing), the corresponding new recommended variable is set equal to 1.

At block 256, the user views the results after the present invention completes the 'Run'. Block 258 creates an MDDB using the data set created by block 254. Block 260 uses the _WRITE_ method of the MDDB_M class to write the MDDB into a data set. Block 262 creates and displays the sub-tables from the MDDB in either a tabular format (FIG. 8, FIG. 9, and FIG. 10) or graphical format (FIG. 14).

At decision block 264, the user may choose to view the rules that were used to create the recommended variables. If the user does not so choose, then processing continues at decision block 272 wherein the user may choose to view a graph of the MDDB. However, if the user does select at decision block 264 the View, Dimensions Rules from the menu, block 266 creates and displays a table (FIG. 11) containing each recommended variable along with that recommended variable's associated logworth in addition to the corresponding input variable name. Block 266 obtains the logworth for each recommended variable from the _GET_RULESET_ method of the SPLITS class, or from the _EVALUATE_RULE_ method of the SPLITS class from block 234 if the original split value was overridden.

At decision block 268, the user may select (from FIG. 11) a recommended variable and then select the 'Browse Rule' button to see that variable's split value(s). If this is the case, then block 270 displays the split value of the selected recommended variable. If the recommended variable is based on an interval input variable, the window of FIG. 12 is displayed. If the recommended variable is based on a non-interval input variable, then the window of FIG. 13 is displayed. In both figures, the user may only view how the recommended variable was created for use in the MDDB. Note that the user may only browse the rule rather than modify the rule, because the MDDB has already been created by block 258.

At decision block 272, the user may choose to see a multidimensional bar chart of the MDDB. If the user does not so choose, then processing terminates at end block 276. However, if the user does choose, then the user selects View, MDDB Graph from the menu and processing continues at block 274. Block 274 displays a graph of the MDDB data set that was created by block 260 using a multidimensional bar chart widget. The user may interact with this graph by choosing different variables in the MDDB data set to set as the X and Z axes. The user may also select a different summary statistic (if more than one statistic was selected in FIG. 6) as shown in FIG. 6 by changing the 'Statistic' field using the drop down box. Using a multidimensional bar chart widget, the graph of the MDDB data automatically updates if these fields are changed. Processing then terminates at end block 276.

Figure 16:
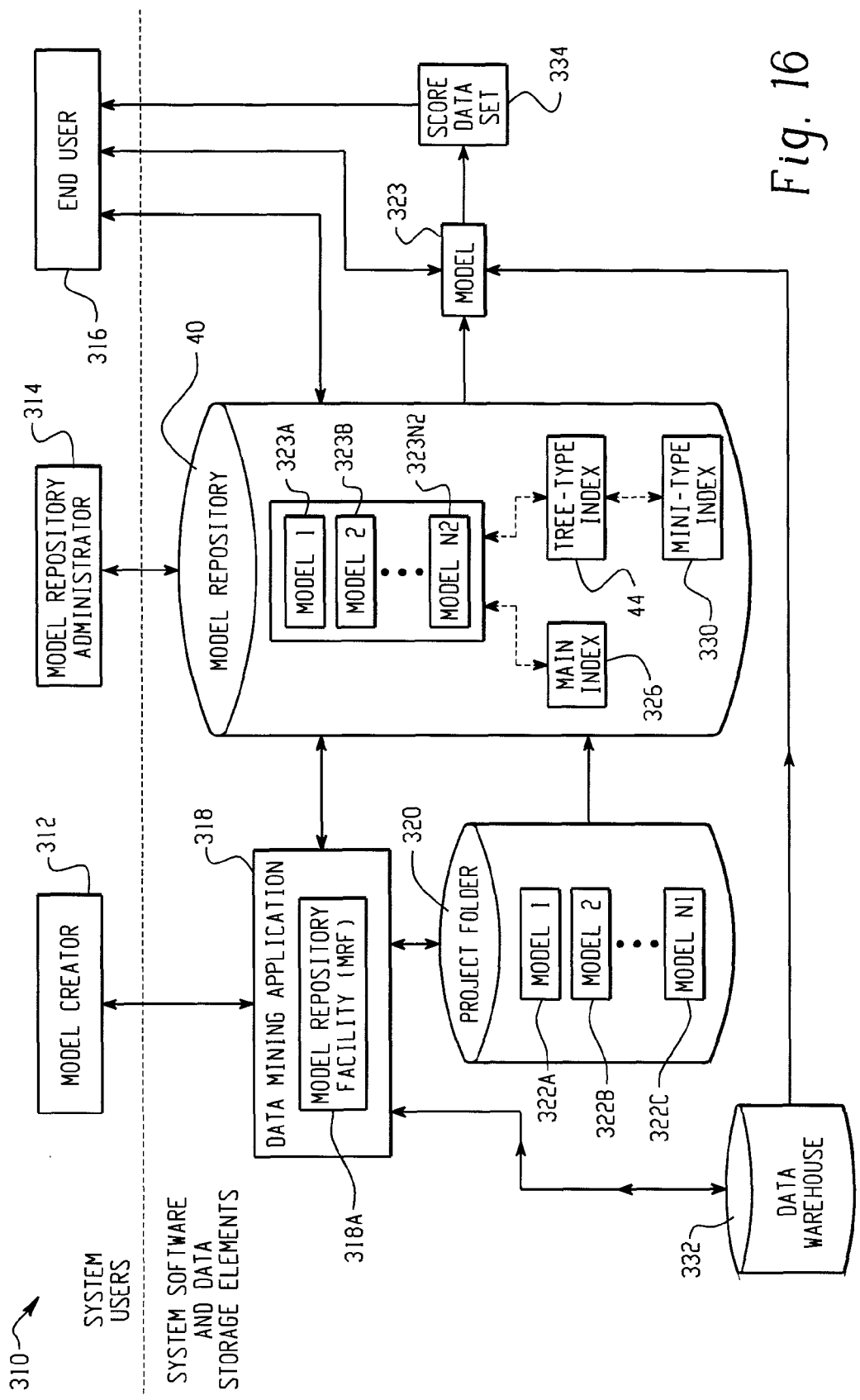
FIG. 16 is a system diagram showing a preferred implementation of a model repository for use with the present invention.

FIG. 16 is a system diagram 310 showing the present invention utilizing a model repository 40. However, it should be understood that the present invention includes embodiments where a model repository is not used. An embodiment of the model repository 40 is a folder. The data mining application 318 preferably includes an integrated model repository facility (MRF) application 318A to control the exportation of models to the model repository 40, and the construction or update of one or more model indexes 326, 44, and 330. Such a data mining application 318 (as mentioned above) is Enterprise Miner™. Alternatively, however, the MRF 318A could be a stand-alone application, in which case it would not be integrated into the data mining application 318.

The data mining application 318 analyzes data records stored in a data warehouse 332, or some other form of data storage facility. In particular, the data mining application 318 includes the present invention's decision tree processing module so that models with splitting variables may be generated, where the splitting variables are the variables in the data that best predict the outcome of the transactions. Although a single data warehouse 332 is shown in FIG. 16 for storing the data records, the data analyzed by the data mining application 318 could be spread out among numerous data warehouses 332 or numerous other database systems.

If the decision trees of the present invention are saved in the model repository 40, there are one or more dimension indexes for the models of the present invention. These indexes include text representations, graph representations, pointers to MDDBs, and model level descriptions. These indexes are used to search the model repository for the decision tree models generated by the present invention. By invoking a model directly from the model repository, the results from the model are displayed by an OLAP viewer.

As described above, the data mining application 318 is executed using a particular model specification. A model specification typically indicates which input data to analyze from the data warehouse 332, which pattern-finding algorithm (such as a neural network, decision tree, etc.) to use for the analysis, how to partition the data, how to assess the results from the analysis, etc. The resulting analysis that is generated by the data mining application 318 when executed according to the specification is the model.

A data model, as generated, is a set of attributes related to the run of a data mining application or another type of statistical-related software application. For example, depending on the algorithm used to create the model, the attributes include the location of the input data, the scoring code, the fit statistics, and so on. However, it should be understood that data models can be generated by applications other than a data mining application, such as by a statistical modeling software application.

The models 322A, 322B, 322C that are generated by the data mining application 318 are initially stored in individual project folders 320. For example, each model creator 312 may have his or her own project folder stored in a database of project folders 320. The model creators 312 would then store their own models 322A, 322B, 322C in their individual project folders.

Using the model repository facility 318A, certain useful ones of the generated models 322A, 322B, or 322C can be selected and exported into the model repository 40. These useful models can then be searched for and retrieved manually by end-users 316, or programmatically by end-user applications 316. As described in more detail with reference to FIG. 17, the models 323A, 323B, 323N2 stored in the model repository 40 are organized according to a plurality of logical levels, including a project level, a diagram level, and a model level. The project level may include one or more diagrams, each of which describes a particular set of model specifications. Each diagram at the diagram level may then be associated with one or more individual models at the model level.

With reference back to FIG. 16, for each level of the model repository structure, one or more additional descriptive attributes may be associated with the models. The attributes provide descriptive information about the model that can be used to identify a particular model in the model repository 40 via a search and retrieval process. These attributes may be automatically associated with the models by the data mining application 318, or by the model repository facility 318A when the model is exported to the model repository 40. In addition, any of the system users 312, 314, 316 may associate additional attributes with the models. The model attributes may be assigned at the project level, the diagram level, or at the individual model level.

These model attributes are then organized and structured into one or more indexes 326, 44, 330, which are also stored in the model repository 40. These indexes may include a main type index 326, which includes some or all of the attributes for each of the models 323A, 323B and 323N2 in the model repository 40, and/or may include one or more special indexes, such as a tree-type index 44, which includes the attributes for a sub-set of all the models stored in the model repository 40. For example, the tree-type index 44 would include certain attributes of those models that were generated using a decision-tree algorithm. As described above, the decision-tree algorithm generates a type of attribute known as splitting variables, which are stored in the tree-type index 44. Also shown in FIG. 16 is a mini-index 330, which provides a quick-search capability for the tree-type index 44. These various indexes are used by end users 316, or by end user applications 316, in order to find a particular model, or set of models, within the model repository by executing a search and retrieval operation on the attributes stored in the indexes 326, 44, 330.

A variety of system users can interact with the data mining application 318 and the model repository 40, including a model creator 312, a model repository administrator 314, and an end-user 316. The model creator 312 is the person who operates the data mining application 318 in order to generate a particular model. The model creator 312 determines the specifications for a particular data mining run, generates the corresponding model based on the specification, and then stores the model in his or her individual project folder 320. Alternatively, the model creator 312 could take an existing model from one of the project folders 320, modify the specification in some manner, and then generate a new model. Moreover, because the data in the data warehouse 332 typically changes over time, a model creator 312 can use the same specification against a later version of the data to generate a new model based on the updated data. The model creator 312 may then utilize the MRF 318A to export certain useful models to the model repository 40.

The model repository administrator 314 performs a variety of functions. One of these functions is to control access to the model repository 40. This may include controlling access rights to certain users, such as read access rights and write access rights. In this manner, the model repository administrator 314 can control which users can add or over-write models in the model repository (those having write access) and which users can only read models (those having only read access). The model repository administrator 314 may also control the process of deleting models from the model repository. Control of model deletion is important to ensure that a user with write access does not inadvertently delete a useful model from the model repository 40. In addition, the model repository administrator 314 may also determine which model attributes will be included in the main index 326.

The end-user 316 is the person who is interested in using the models in the model repository 40. The end-user 316 could also be a model creator 312, although not all end-users will be creating models. The end-user 316 accesses the model repository 40 and searches for an appropriate model 323A, 323B, 323N2 by examining the one or more index structures 326, 44, 330. By supplying search parameters and then comparing these search parameters against the attributes stored in the index structures, the end-user 316 is able to find one or more useful models. Having found a useful model, the end-user 316 may then obtain a copy of the information contained in the model. A special graphical user interface could be provided to the end-user 316 in order to facilitate the search and retrieval process with the model repository 40. The graphical user interface can be used to send a search and/or retrieval request to the model repository 40 over a network, such as a local, wide area, or global (e.g., Internet) network.

The end-user 316 may also be an end-user application program that programmatically searches for and retrieves an appropriate model from the model repository 40. The end-user application program can send a search and/or retrieval request to the model repository 40 over a network, such as a local, wide area, or global (e.g., Internet) network. This search and retrieval capability makes it possible to automate the deployment of models for specific purposes. For example, suppose that part of the operation of an application requires that it find a "best" model (perhaps based on the one with the best assessment results). Or suppose that part of the operation requires it to choose a model from many similar ones (perhaps based on the one that was most recently generated from certain input data). That part of the operation can be accomplished automatically using the indexes 326, 44, 330 to find the one or more models 323, and then by employing some type of comparison algorithm in order to determine which model is most suitable for the particular task. For example, the comparison algorithm could look for the model with the lowest rate of misclassification. The ability to search for a model or models programmatically is particularly important in real-time applications, such as web-based applications, because a person could not find the appropriate model or models fast enough to suit the real-time nature of the task. The selected model then could be used by the end user 316, for example to generate scored data 334.

In addition, with the appropriate access level, an end-user 316 could from time-to-time make a copy of the index(es) 326, 44, 330 and modify them in order to improve performance. Search and retrieval performance on the indexes would be improved because the modified copies would be stored locally to the end-user, and because the copies could contain only the rows and columns of the index structure needed for his or her purpose. In this manner, each end-user 316 could maintain his or her own index structures for the model repository 40.

Although a single model repository 40 is shown in FIG. 16, this is just one example of a system 310 employing the invention. Alternatively, a particular business enterprise may have more than one model repository 40. In addition, a given model repository 40 may have more than one main-type index 326, or more than one special-type indexes 44, 330. For example, the marketing group of a particular business could have their own main index structure 326 that is based on the model attributes that matter for their purposes, and the sales group (i.e., non-technical individuals) could have their own main index structure 326 that is based on other model attributes that matter for their purposes. Although a particular model repository 40 may have more than one special-type index 44, it is preferable that for the particular type of special-type index, such as the tree-type index 44 and mini-index 330, there would be only one of that type of index for each model repository 40.

Figure 17:
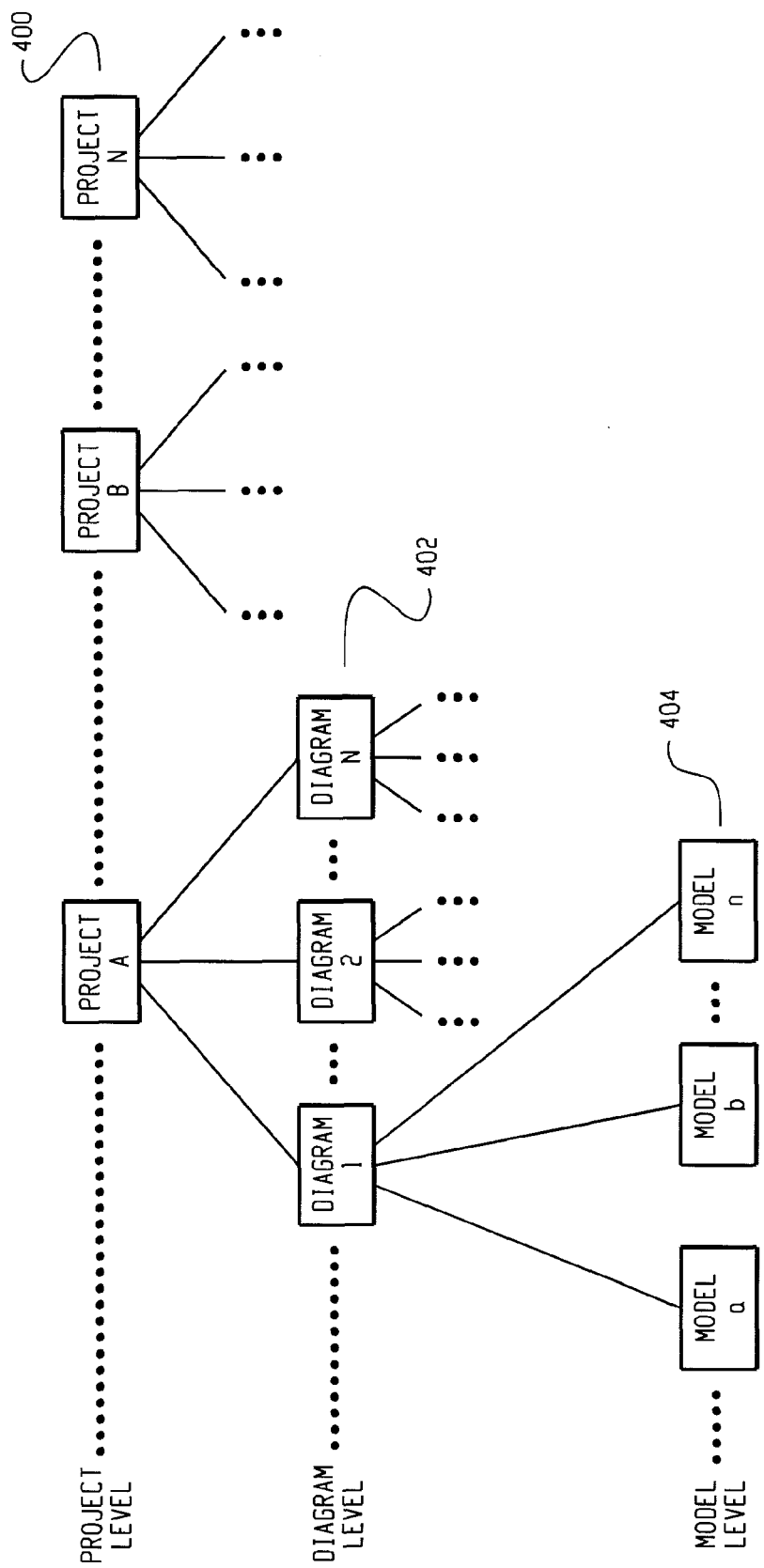
FIG. 17 is a diagram showing a preferred structure for storing models within the model repository.

FIG. 17 is a diagram showing a preferred structure for storing models within the model repository 40. According to this preferred structure, the model repository 40 is organized into three levels, the project level 400, the diagram level 402, and the model level 404. Each project, for example Project A, at the project level 400, may refer to one or more diagrams at the diagram level 402. Each diagram, such as Diagram 1, may then refer to one or more individual models at the model level 404.

Using this structure, multiple data mining projects can be associated with the same model repository 40, multiple data mining diagrams can be associated with the same project, and multiple models can be associated with the same diagram. A diagram represents the specifications for a data mining run. There are typically groups of specifications, such as those related to the input data, the sampling technique, the data partitions, the data mining algorithm, the assessment methods, etc. More than one model may be associated with each of these diagrams. For example, although the specification may be the same for two models, there may be some attribute of the models that is different, such as when the model was run, that will result in a different model based on the same specification.

The first time that a request is received by the MRF 318A to export a model to the model repository 40 for a given project, a folder is created at the project level 400 for that project. The name of the project-level folder preferably identifies the current date and time and the last three characters of the requestor's user identification. For example if the current time was May 19, 2000:16:15:40 and the model export request was made by a person with the user identification "abc," then the name of the new project-level folder would be "2000_05_19_16_15_40_abc_project". Note, however, that this is just one way to determine the name for the project-level folders, and other methods could certainly be utilized.

The first time that a diagram is encountered within a particular project, the diagram is given a sequential number, such as 000, 001, 002, 003, . . . , etc. For a given diagram, there could be multiple models. For example, suppose the input data is sales records. If the diagram is used once a month, there will be one model each month. If every month's model is worth saving, every month the model repository 40 receives an additional model that is associated with that diagram of that project. Within a given project and diagram, there is thus a one-to-many relationship between the diagram and its models (and between the project and its diagrams).

The name of the model's folder preferably identifies the diagram with which the model is associated (i.e., 000, 001, 002, 003, . . . , etc.) and also preferably identifies the model itself. Each model preferably has a model-identification that is unique within the diagram and unique within the project.

The above description sets forth an embodiment of the organization of the model repository 40. The coarse organization is provided by project-id, diagram-number, and model-id. Although these identifiers provide a useful way to identify a model, a general search is likely to require a finer level of granularity. In order to provide this finer level of granularity, the present invention uses the concept of model attributes. Some attributes are automatically generated and associated with the models in the project folder 320 by the data mining application 318. If permitted by the export-results option, these attributes are associated with the models in the model repository 40 by the model repository facility 318A. The MRF 318A also generates attributes that it associates with the models in the model repository 40.

Model descriptors are additional attributes that are associated with the models in the model repository 40, and also may be used in the main index 326, which can be searched by a user in order to find and retrieve a particular model 323 or set of models. Descriptors can be assigned at the project level, the diagram level, and/or at the model level. Descriptors can be manually associated with the models in the project folder 20 by any of the system users 312, 314, 316. A descriptor preferably includes a variable-value pair, such as "site=Chicago" or "size=100,000". In these examples, site is a variable and Chicago is its value, and size is a variable and 100,000 is its value. The variable-value pairs may be manually specified by one of the system users 312, 314, 316 via a graphical user interface element, such as a pop-up window, notes tab, or other graphical data entry means, for selecting the particular project, diagram or model, and then for entering the appropriate descriptor.

As a result of these levels of attributes, a given model is identified by its own attributes, the attributes of its diagram, and the attributes of the diagram's project. By storing and organizing these model attributes in the various index structures 326, 44, 330 of the model repository 40, a much finer granularity for searching is provided.

FIG. 18 is a preferred data structure for a main-type index 326 that is part of the model repository 40 shown in FIG. 16. The main-type index 326 is structured as a table. The table includes a first column 340 in which the model is identified, and a plurality of other columns 342A, 342B, . . . , 342N, in which a plurality of attributes are specified. If the model's identification is not unique within the model repository, then an additional column is used to identify the project for which the model was generated. As noted above, each attribute is specified by a variable-value pair. The variables are listed in the first row of the table as Attribute A1, Attribute A2, Attribute A3, . . . , Attribute M1. The values for a given model are then set forth in the cells of the table for the row that is identified by the particular model's identification (and project identification, if necessary). The model names 344 preferably include an initial numerical identifier, such as "000" or "001", which identifies the diagram with which the particular model is associated.

In principle, the main-type index 326 could be constructed using the variables for every attribute associated with the models stored in the model repository 40. For practical reasons, however, the model repository administrator 314 preferably selects a subset of the attributes in order to construct the index, where the subset represents the attributes that end-users 316 most likely would utilize in order to conduct a search. Preferably, in the model repository's configuration subfolder, the model repository administrator 314 lists in the columns Info_user.text file the subset of human-defined descriptors that are to be used in the main index, and in the Columns Info_system.text file the subset of data-mining-application-defined attributes that are to be used in the main index. In addition, the model repository administrator 314 could decide to build more than one main-type index 326 for the model repository 40. Having more than one main index 326 would be useful if the search strategies employed by users can be grouped into several categories. In this situation, there could be one main-type index 326 per search category, with the attributes in that index being the ones that are useful in that category of search.

FIG. 19 is one of two preferred data structures 328A and 328B for a tree-type index 44 that is part of the model repository 40 shown in FIG. 16. Like the main-type index 326, the tree-type index 328A is organized as a table. The first column of the table 350 identifies the model 354. If the model's identification is not unique within the model repository, then an additional column is used to identify the project for which the model was generated. The remaining columns 352A, 352B, 352C, . . . , 352N set forth a plurality of attributes that are specific to the models associated with the tree-type index. These models were generated using a decision tree algorithm in accordance with the teachings of the present invention. For the tree-type index 328A, these special attributes are called the splitting variables. The intersection of a row and column in the tree-type index 328A is a cell that indicates whether or not (Yes or No, 1 or 0) a particular splitting variable is used in a particular model.

A model that results from a decision tree analysis identifies the variables that enable groups to be identified within the data. The records/observations within a group have similar behavior with respect to a target variable. For example, in a sales analysis, the target variable might be the one that contains the total amount of the sale. The variables that define the groups in the decision tree analysis are called predictor variables. The predictor variables that are most important to the analysis are called the splitting variables. It is these splitting variables that are listed in the tree-type index 44. The other predictor variables describe splits that are too trivial to matter to the outcome of the analysis.

The tree-type index 328A is preferably constructed using every splitting variable in the model repository 40. There are preferably two formats for the tree-type index 44. The format that is most comfortable for people to work with (such as, index 328A), if browsing the index, may or may not be the format that gives the best performance (such as, index 328B) to an application that may be automatically searching for and retrieving models from the model repository 40.

The first format 328A is shown in FIG. 19, as described above. The second format 328B is a table that has as many rows per model as the model has splitting variables. This second format 328B is shown in FIG. 20, and includes two columns, a first column 360 that identifies the model, and a second column 362 that identifies the splitting variable. If the model's identification is not unique within the model repository, then an additional column is used to identify the project for which the model was generated. In this second format, if a model has four splitting variables, then the model has four rows in the table.

If the number of rows in the tree-type index 44 becomes too large for efficient searching, then an additional mini-index 330 can be provided in the model repository 40. The mini-index 330 contains a list of the names of all the splitting variables in all the models. In the mini-index 330, each splitting variable name appears only once. In the tree-type index 44, each splitting variable name may appear many times. Thus, the mini-index 330 is an index to the tree-type index 44. If the mini-index 330 is searched first, and the splitting variable that is needed is not there, then there is no need to search the tree-type index 44, thus making the search process more efficient.

Figure 21:
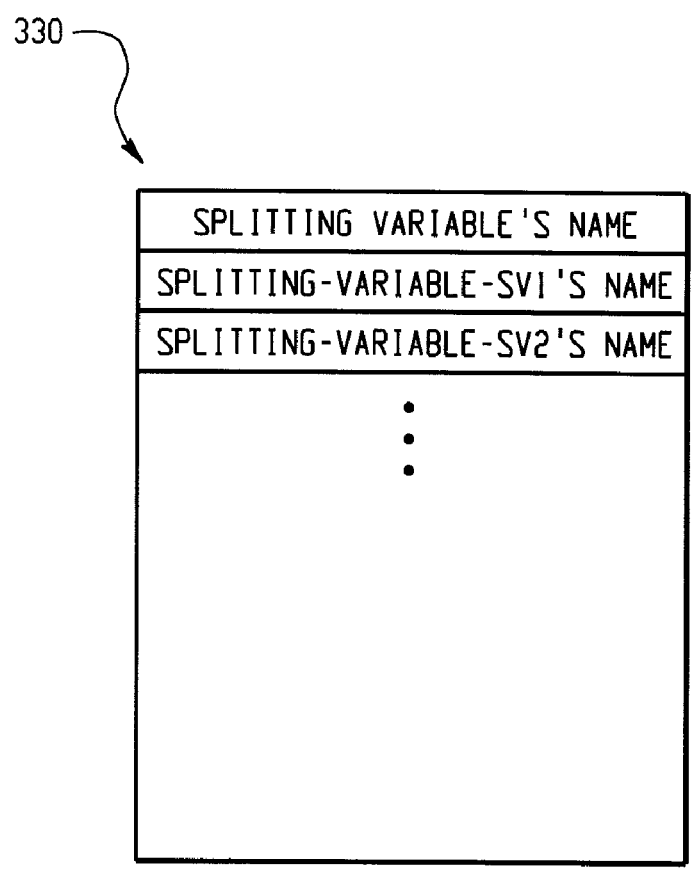
FIG. 21 is a preferred structure for a mini-index that is part of the model repository shown in FIG. 16.

FIG. 21 is a preferred data structure for a mini-index 330 that is part of the model repository 40 shown in FIG. 16. The mini-index is a table. The table includes one column, which identifies the name of a splitting variable that is in at least one of the models in the model repository.

The preferred embodiment described with reference to the drawing figures is presented only to demonstrate an example of the invention. Additional, and/or alternative, embodiments of the invention would be apparent to one of ordinary skill in the art upon reading this disclosure. For example in an alternate embodiment, the users declare variables that are traditionally used as OLAP dimensions (within their input data set) as OLAP dimension variables. These variables are marked to notify the analyst of their role as OLAP dimension variables. The analyst can choose to use these traditional OLAP dimensions in the MDDB, along with the recommended variables from the competing initial split method.

As another example of the broad range of the present invention, by utilizing the model repository, the user can access the results of models from the D-Engine system of the present invention. Within these models, the recommended variables associated with the models are also accessed. The user could use the recommended variables from a model repository model (provided the same variables exist in the data they are analyzing) as OLAP dimension variables in their current model. This is helpful, for example, if from month-to-month the user is analyzing the same input variables, but the input variables constitute evolving data. For example, in one month the present invention may recommend a variable to split in one manner. The next month, the present invention may recommend that same variable to split in another manner (because the data has changed). By accessing the model repository for the previous month's model, and extracting the recommended variables for that model, the user could select last month's recommended variables as OLAP dimension variables for their input data set for the current month's model. The user could then compare last month's recommended variable to this month's recommended variable.

As still another example of the broad range of the present invention, the present invention includes using splits other than binary splits, such as grouping the data for any given variable into more than two groups.

Figure 22:
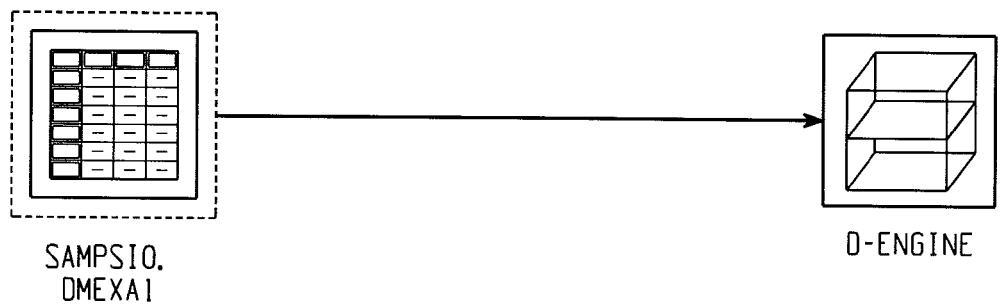
FIGS. 22 and 23 are data mining diagrams depicting the data connections among data sources and data processing components.
Figure 23:
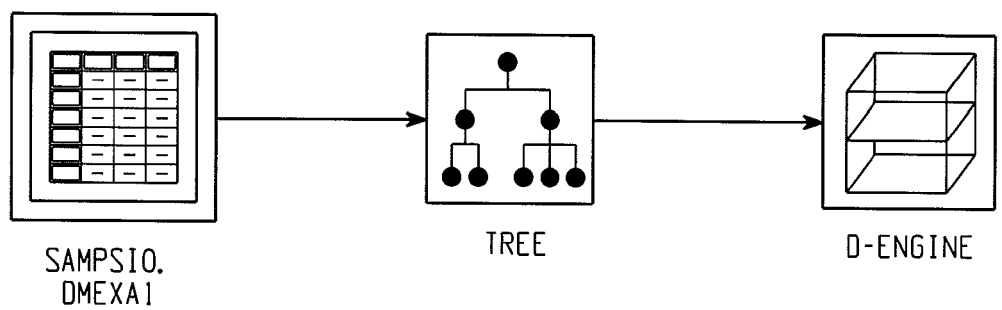

As a further example of the broad range of the present invention, the present invention includes enabling the D-Engine data mining node to use recommendations based on a tree node. FIG. 22 depicts a data mining diagram having a direct connection between the input data source and the D-Engine node (which includes a D-Engine variable configuration module). FIG. 23 depicts an alternate embodiment wherein the data mining diagram connects the input data source to a decision-tree node and that node to the D-Engine node. An advantage of this is that the user has more control over the tree node, and could make specifications that take into account the user's understanding of the business and the user's understanding of other methods for selecting the variables with the best predictive power. For example, the user could use the Tree node to run the decision-tree algorithm using a method other than the competing initial splits method (for example a method that identifies terminal nodes). The results of this more sophisticated analysis could be directly available to the D-Engine, so the D-Engine does not have to perform its own decision tree processing. The D-Engine could also display the tree diagram from the tree node within the D-Engine node. The tree diagram describes the order that the variables were selected and the groupings of values of the variables. This allows the MDDB sub-tables containing the recommended variables to be viewed along side with the tree diagram used to create these recommended variables. When storing this D-Engine model in the model repository, the tree diagram is also stored.

Still further, the present invention includes handling more than one target variable at a time. For example, it may analyze (at the same time) the sales of several related products.

Still further, the present invention includes customization of the MDDB sub-tables in the results display to the user. In this alternate embodiment, the user is able to designate which dimension variables they would like displayed on the rows versus the columns. The user is also able to designate the location of the summary statistic in the sub-tables. Within the sub-tables, the user is able to select a particular heading, and choose to sort ascending or descending on that row/column. This sorting ability is useful to the users. For example, the user can quickly see the maximum or minimum value of his or her analysis variable relative to certain dimension variables.

Still further, the present invention includes allowing the user to graph the difference between their user-defined split value, and the split value determined by the decision tree algorithm. In this alternate embodiment, the present invention provides a graphing mechanism to display to the user the relation between their user-defined value and the value found by the decision tree algorithm. The present invention measures this relation based upon the logworth of each split (which can be user-defined or decision tree algorithm defined), or based upon the correct classification rate of each split.

The invention claimed is:

1. A computer-implemented multi-dimension data analysis apparatus, comprising:
   a computer data store for storing input data that has dimension variables and at least one pre-selected target variable;
   a decision tree processing module connected to the data store that automatically determines a subset of dimension variables for splitting the input data, wherein the decision tree processing module generates a model that uses a competing initial splits approach to identify the subset of dimension variables that best predicts the outcome of one or more transactions represented by one or more values corresponding to the pre-selected target variable, and wherein the model specifies one or more splitting rules used to split the input data; and
   a multi-dimension viewer that generates a report using the subset of dimension variables and the split input data.

2. The apparatus of claim 1, wherein the subset of dimension variables includes continuous variables.

3. The apparatus of claim 1, wherein the subset of dimension variables includes category-based variables.

4. The apparatus of claim 1, further comprising:
   a selector module for amending the set of dimension variables included in the subset.

5. The apparatus of claim 4, wherein at least one statistic measure is generated, and wherein the static measure is indicative of how well the subset of dimension variables predicts the outcome.

6. The apparatus of claim 5, wherein the statistic measure is a logworth statistic measure.

7. The apparatus of claim 1, further comprising:
   a selector module for amending splitting values corresponding to the one or more splitting rules used to split the input data.

8. The apparatus of claim 1, wherein the input data set includes a plurality of dimension variables and a single pre-selected target variable.

9. The apparatus of claim 1, wherein the input data set includes a plurality of dimension variables and a plurality of pre-selected target variables.

10. The apparatus of claim 1, wherein the decision tree processing module splits the input data into groups, and wherein the multi-dimension viewer generates the report using the groups.

11. The apparatus of claim 1, wherein the model generates an initial split variable, and wherein the initial split variable is the most important variable in predicting the outcome.

12. The apparatus of claim 11, wherein the model generates a second split variable, and wherein the second split variable is the second most important variable in predicting the outcome.

13. The apparatus of claim 1, wherein the decision tree processing module generates binary splits of the input data.

14. The apparatus of claim 1, wherein the decision tree processing module generates splits of the input data that are other than binary splits.

15. The apparatus of claim 1, wherein the generated report is viewed substantially adjacent to the subset of dimension variables and the split input data.

16. The apparatus of claim 1, wherein the generated report has a format selected from the group consisting of: a textual report format, a tabular report format, a graphical report format, and combinations thereof 17. The apparatus of claim 16, further comprising:
   receiving a selection of one of the report formats, wherein the selection is received at the multi-dimensional viewer, and wherein the selection is used to view the subset of dimension variables and the split input data.

18. The apparatus of claim 17, wherein the input data includes more than fifty dimension variables, and wherein the subset of dimension variables includes less than seven dimension variables.

19. The apparatus of claim 1, further comprising:
   receiving a selection of a type of summary statistics, wherein the selection is received at the multi-dimensional viewer, and wherein the selection is used to view the subset of dimension variables and the split input data.

20. The apparatus of claim 1, further comprising:
   a model repository for storing a model that contains the dimension variables and splitting values of the dimension variables.

21. The apparatus of claim 20, wherein the decision tree processing module splits the input data into a first set of groups according to first splitting rules to form a first model, wherein the decision tree processing module splits different input data into a second set of groups according to second splitting rules to form a second model, and wherein the model repository includes a splitting rules index to store which splitting rules are used with which model.

22. The apparatus of claim 21, wherein the splitting rules index is searched in order to locate a model stored in the model repository.

23. The apparatus of claim 22, wherein the model repository includes a project level storage, a diagram level storage, and a model level storage for storing the first and second models.

24. The apparatus of claim 21, wherein a search request is provided over a computer network to retrieve the first model from the model repository.

25. The apparatus of claim 24, wherein the computer network is an Internet network.

26. The apparatus of claim 21, wherein the model repository includes a plurality of specialty splitting rules indices that are used to locate a model stored in the model repository.

27. The apparatus of claim 26, wherein the specialty splitting rules indices are indices selected from the group consisting of: marketing specialty splitting rules indices, sales specialty splitting rules indices, and combinations thereof.

28. The apparatus of claim 21, wherein the model repository includes a mini-index means with a connection to the splitting rules index.

29. The apparatus of claim 1, wherein a data mining application provides construction of a process flow diagram, and wherein the process flow diagram includes nodes representative of the input data and a variable configuration module.

30. The apparatus of claim 29, wherein an activated variable configuration module node provides a graphical interface for amending the selection of dimension variables included within.

31. The apparatus of claim 30, wherein the process flow diagram further includes a node representative of the decision tree processing module that includes the competing initial splits approach for determining the subset of dimension variables.

32. A computer-implemented multi-dimension data analysis method, comprising:
storing, using one or more processors, input data that has dimension variables and at least one pre-selected target variable;
automatically determining a subset of dimension variables for splitting the input data, by generating a model that uses a competing initial splits approach to identify the subset of dimension variables that best predicts the outcome of one or more transactions represented by one or more values corresponding to the pre-selected target variable, and wherein the model specifies one or more splitting rules used to split the input data; and
generating a report using the subset of dimension variables and the split input data.

33. The method of claim 32, wherein the subset of dimension variables includes continuous variables.

34. The method of claim 32, wherein the subset of dimension variables includes category-based variables.

35. The method of claim 32, further comprising:
amending the set of dimension variables included in the subset of dimension variables.

36. The method of claim 35, further comprising:
generating at least one statistic measure that is indicative of how well the subset splitting of dimension variables predicts the outcome.

37. The method of claim 36, wherein the statistic measure is a logworth statistic measure.

38. The method of claim 32, further comprising:
amending splitting values corresponding to the one or more splitting rules used to split the input.

39. The method of claim 32, wherein the input data set includes a plurality of dimension variables and a single pre-selected target variable.

40. The method of claim 32, wherein the input data set includes a plurality of dimension variables and a plurality of pre-selected target variables.

41. The method of claim 32, further comprising:
using a decision tree algorithm to determine the subset of dimension variables.

42. The method of claim 41 wherein the decision tree algorithm splits the input data into groups, and wherein the multi-dimension viewer generates the report using the groups.

43. The method of claim 32, wherein an initial split variable is generated, and wherein the initial split variable is the most important variable in predicting the outcome.

44. The method of claim 43, wherein a second split variable is generated, and wherein the second split variable is the second most important variable in predicting the outcome.

45. The method of claim 32, further comprising:
generating binary splits of the input data.

46. The method of claim 32, further comprising:
generating splits of the input data that are other than binary splits.

47. The method of claim 32, wherein the generated report is viewed substantially proximate to the subset of dimension variables and the split input data.

48. The method of claim 32, wherein the generated report has a format selected from the group consisting of: a textual report format, a tabular report format, a graphical report format, and combinations thereof.

49. The method of claim 48, further comprising:
receiving a selection of one of the report formats, wherein the selection is received at the multi-dimensional viewer, and wherein the selection is used to view the subset of dimension variables and the split input data.

50. The method of claim 49, wherein the input data includes more than fifty dimension variables, and wherein the subset of dimension variables includes less than seven dimension variables.

51. The method of claim 32, further comprising:
receiving a selection of a type of summary statistics, wherein the selection is received at the multi-dimensional viewer, and wherein the selection is used to view the subset of dimension variables and the split input data.

52. The method of claim 32, further comprising:
storing a model in a model repository, wherein the model contains the dimension variables and splitting values of the dimension variables.

53. The method of claim 52, further comprising:
storing the model in a project level storage, a diagram level storage, and a model level storage of the model repository.

54. The method of claim 52, wherein a search request is provided over a computer network to retrieve the model from the model repository.

55. The method of claim 54, wherein the computer network is an Internet network.

56. The method of claim 52, wherein the model repository includes a plurality of specialty splitting rules indices that are used to locate the model stored in the model repository.

57. The method of claim 56, wherein the specialty splitting rules indices are indices selected from the group consisting of: marketing specialty splitting rules indices, sales specialty splitting rules indices, and combinations thereof.

58. The method of claim 32, wherein a data mining application provides construction of a process flow diagram, and wherein the process flow diagram includes nodes representative of the input data and a variable configuration module.

59. The method of claim 58, further comprising:
activating the variable configuration module; and using the activated configuration module to amend the selection of dimension variables included within in the subset.

60. A computer-implemented multi-dimension data analysis apparatus, comprising:
a computer data store for storing input data that has dimension variables and at least one pre-selected target variable;
a decision tree processing module connected to the data store that automatically determines a subset of dimension variables for splitting the input data, wherein the decision tree processing module generates a model that uses a non-competing initial splits approach to identify the subset of dimension variables that best predicts the outcome of one or more transactions represented by one or more values corresponding to the pre-selected target variable, and wherein the model specifies one or more splitting rules used to split the input data; and
a multi-dimension viewer that generates a report using the subset of dimension variables and the split input data.

61. A computer-implemented multi-dimension data analysis method, comprising:

storing, using one or more processors, input data that has dimension variables and at least one pre-selected target variable;

automatically determining a subset of dimension variables for splitting the input data, by generating a model that uses a non-competing initial splits approach to identify the subset of dimension variables that best predicts the outcome of one or more transactions represented by one or more values corresponding to the pre-selected target variable, and wherein the model specifies one or more splitting rules used to split the input data; and generating a report using the subset of dimension variables and the split input data.

* * * * *

UNITED STATES PATENT AND TRADEMARK OFFICE
CERTIFICATE OF CORRECTION

| | | |
|---|---|---|
| PATENT NO. | : 7,818,286 B2 | Page 1 of 1 |
| APPLICATION NO. | : 09/766789 | |
| DATED | : October 19, 2010 | |
| INVENTOR(S) | : Chu et al. | |

It is certified that error appears in the above-identified patent and that said Letters Patent is hereby corrected as shown below:

In column 20, line 16, insert a -- . -- at the end of the sentence.

In column 21, line 6, insert -- the subset -- after the word -- within --.

In column 22, line 48, insert a paragraph after "and".

In column 22, line 50, delete "in".

Signed and Sealed this
Eighth Day of February, 2011

David J. Kappos
*Director of the United States Patent and Trademark Office*